(12) United States Patent
Tian et al.

(10) Patent No.: US 7,664,391 B2
(45) Date of Patent: Feb. 16, 2010

(54) METHOD AND SYSTEM FOR SHARED OPTICAL REGENERATION

(75) Inventors: Cechan Tian, Plano, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 791 days.

(21) Appl. No.: 11/015,208

(22) Filed: Dec. 17, 2004

(65) Prior Publication Data
US 2006/0133802 A1 Jun. 22, 2006

(51) Int. Cl.
G02F 1/00 (2006.01)
H04B 10/00 (2006.01)

(52) U.S. Cl. .................. 398/3; 398/1; 398/2; 398/4; 398/5; 398/6; 398/7; 398/59; 398/79; 398/83; 398/175

(58) Field of Classification Search .............. 398/3, 398/4, 5, 7, 31, 59, 1, 2, 6, 83, 175
See application file for complete search history.

(56) References Cited

U.S. PATENT DOCUMENTS

| | | | |
|---|---|---|---|
| 6,046,833 A * | 4/2000 | Sharma et al. ............. 398/48 |
| 6,321,004 B1 | 11/2001 | Duerksen et al. ............. 385/24 |
| 6,616,350 B1 | 9/2003 | de Boer et al. ............. 398/9 |
| 6,643,041 B1 | 11/2003 | Ikeda et al. ............. 359/124 |
| 6,771,908 B2 | 8/2004 | Eijk et al. ............. 398/66 |
| 6,778,781 B2 | 8/2004 | Van Eijk et al. ............. 398/100 |
| 6,816,680 B2 | 11/2004 | Purse et al. ............. 398/5 |
| 7,072,580 B2 * | 7/2006 | Arecco et al. ............. 398/4 |
| 2002/0186432 A1 * | 12/2002 | Roorda et al. ............. 359/128 |
| 2004/0028319 A1 * | 2/2004 | Ajgaonkar et al. ............. 385/16 |
| 2004/0240884 A1 * | 12/2004 | Gumaste et al. ............. 398/59 |

* cited by examiner

Primary Examiner—Ken N Vanderpuye
Assistant Examiner—Daniel G Dobson
(74) Attorney, Agent, or Firm—Baker Botts L.L.P.

(57) ABSTRACT

An optical network includes an optical ring that is capable of transmitting, between two or more nodes, a plurality of working traffic streams that include traffic transmitted in one of a plurality of wavelengths. A node is capable of transmitting, in a first wavelength, a first protection traffic stream associated with a first working traffic stream, in response to an interruption of the first working traffic stream. A node is also capable of transmitting, in a second wavelength, a second protection traffic stream associated with a second working traffic stream, in response to an interruption of the second working traffic stream. The optical network also includes a regeneration element capable of selectively regenerating the first protection traffic stream. The regeneration element is also capable of tuning the regeneration element to receive traffic in the second wavelength and of selectively regenerating the second protection traffic stream.

13 Claims, 14 Drawing Sheets

METHOD AND SYSTEM FOR SHARED OPTICAL REGENERATION

TECHNICAL FIELD OF THE INVENTION

The present invention relates generally to optical transport systems, and more particularly to an optical ring network with shared regeneration and protection elements.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. Nonetheless, the static assignment of traffic streams to particular channels results in inflexible systems unable to efficiently use available network capacity and other network resources.

SUMMARY

The present invention provides an optical ring network having components operable to support protected optical transmissions using shared signal regeneration elements and/or shared protection channels.

According to a particular embodiment of the present invention, an optical network includes an optical ring, a plurality of nodes, and a regeneration element. The optical ring couples the plurality of nodes and is operable to transmit a plurality of working traffic streams between two or more of the nodes. Each of the working traffic streams includes traffic transmitted in one of a plurality of wavelengths of an optical signal. The plurality of working traffic streams further includes a first working traffic stream and a second working traffic stream.

Moreover, one or more of the plurality of nodes is operable to, in response to an interruption of the first working traffic stream, transmit, in a first wavelength, a first protection traffic stream associated with the first working traffic stream. The at least one node is also operable to, in response to an interruption of the second working traffic stream, transmit, in a second wavelength, a second protection traffic stream associated with the second working traffic stream.

Additionally, the regeneration element is coupled to the optical ring and operable to selectively regenerate the first protection traffic stream. The regeneration element is further operable to tune the regeneration element to receive traffic in the second wavelength in response to the interruption of the second working traffic stream and to selectively regenerate the second protection traffic stream.

Technical advantages of one or more embodiments of the present invention may include the ability to provide signal regeneration for a plurality of traffic streams using a commonly shared signal regeneration element. In particular embodiments, this may result in an optical network capable of providing regeneration functionality with a reduced number of components. Another technical advantage of certain embodiments is the ability to transmit protection traffic streams on a commonly shared protection wavelength. In particular embodiments, such shared protection schemes may result in an optical network having an increased number of working wavelengths and, thus, having a greater capacity for working traffic.

It will be understood that the various embodiments of the present invention may include some, all, or none of the enumerated technical advantages. In addition, other technical advantages of the present invention may be readily apparent to one skilled in the art from the figures, description and claims included herein.

DETAILED DESCRIPTION

Figure 1:
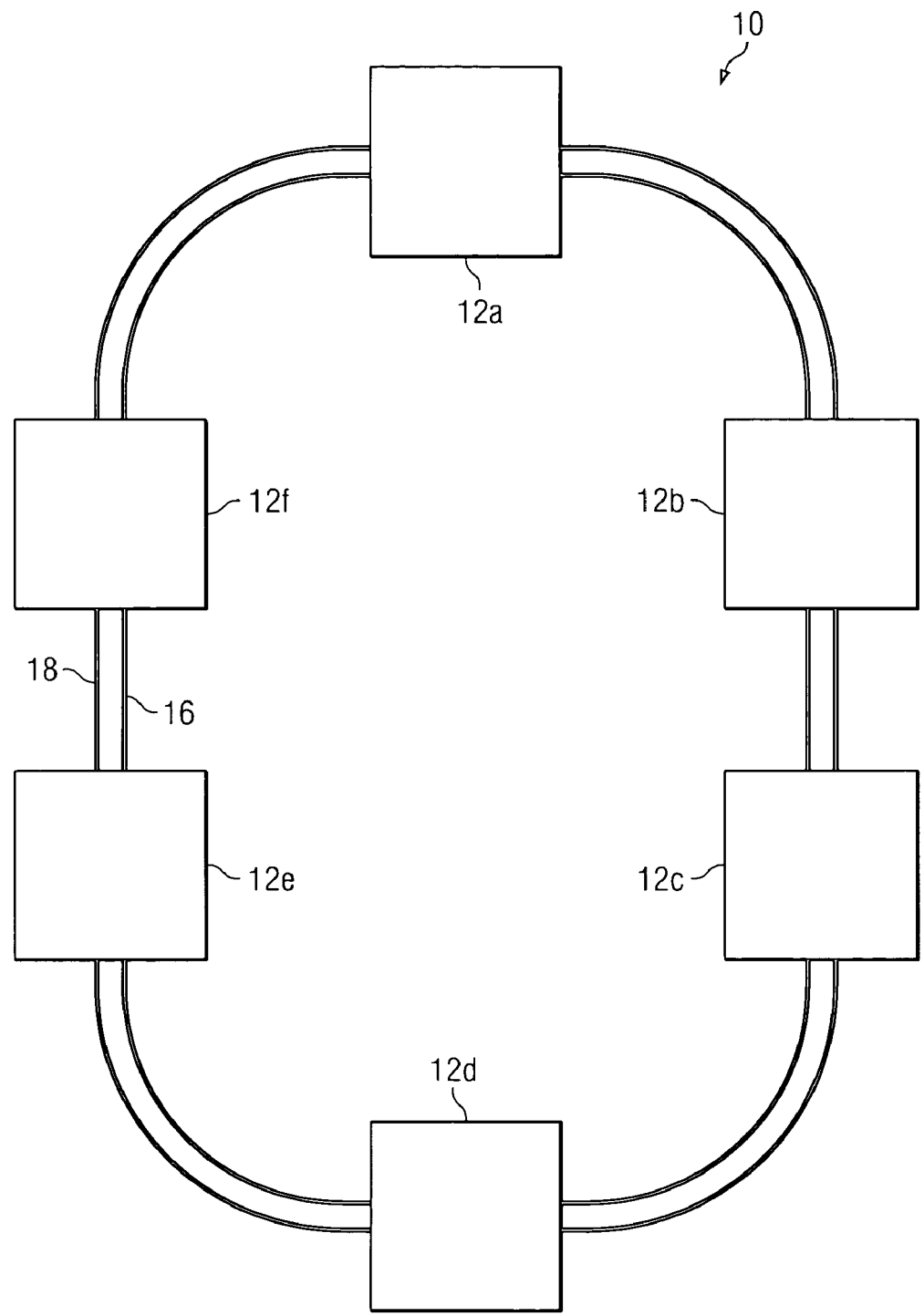
FIG. 1 is a block diagram illustrating an optical network in accordance with one embodiment of the present invention.

FIG. 1 is a block diagram illustrating an optical network 10 in accordance with one embodiment of the present invention. Network 10 includes an optical ring for transmitting information in the form of optical signals between a plurality of nodes 12. Nodes 12 and/or other appropriate components of network 10 can be configured to transmit and receive information on dynamically-assigned wavelengths. As a result, network 10 is capable of facilitating efficient use of network capacity and certain network resources.

Network 10 may be an optical network in which a number of optical channels are carried over a common path in disparate wavelengths/channels. For the purposes of this description, the terms "channel" and "wavelength" may be used interchangeably. Network 10 may be a wavelength division multiplexing (WDM), dense wavelength division multiplexing (DWDM), or other suitable multi-channel network. Network 10 may be used as a short-haul metropolitan network, a long-haul inter-city network, or any other suitable network or combination of networks.

In accordance with a particular embodiment, network 10 includes an optical ring. This optical ring may represent, as appropriate, a single, uni-directional fiber; a single, bi-directional fiber; or a plurality of uni- or bi-directional fibers. In the illustrated embodiment, the optical ring includes a pair of uni-directional fibers, each transporting optical signals in opposite directions, specifically a first fiber 16 and a second fiber 18. First fiber 16 and second fiber 18 connect a plurality of nodes 12 that communicate information between one another as optical signals. In the illustrated embodiment, first fiber 16 forms a clockwise ring in which optical signals are transmitted in a clockwise direction. Second fiber 18 forms a counterclockwise ring in which optical signals are transmitted in a counterclockwise direction.

Nodes 12 are each operable to add and drop traffic to and from fibers 16 and 18 to facilitate communication between sub-networks, client devices, and/or other suitable components of network 10 coupled to nodes 12. As used herein, "traffic" or "traffic streams" may mean any information transmitted, stored, or sorted in the network in the form of optical signals, including any request for services. Such traffic may comprise optical signals having at least one characteristic modulated to encode audio, video, textual, real-time, non-real-time and/or other suitable data. Modulation may be based on phase shift keying (PSK), intensity modulation (IM), and other suitable methodologies. Additionally, such traffic may be structured in any appropriate form including, but not limited to, as one or more frames, packets, or unstructured bit streams.

More specifically, nodes 12 may be capable of forwarding traffic from sub-networks, neighboring networks, client devices, or other elements of network 10 to fibers 16 and 18 and of forwarding traffic from fibers 16 and 18 to these same components. In adding and dropping traffic, nodes 12 may combine traffic from appropriate components for transmittal on fibers 16 and 18 and may drop channels of traffic from fibers 16 and 18 to these same components. Nodes 12 may drop traffic by forwarding or copying the traffic from fiber 16 or 18 and making the traffic available for transmission to the relevant components. Thus, traffic may be dropped and yet continue to circulate on a ring. Moreover, nodes 12 may be operable to terminate traffic channels that have reached their destination (including those that have or will reach their destination in an opposite direction) and to forward traffic channels that have not reached their destination nodes to other nodes 12 on fibers 16 and 18. The contents and operation of a particular embodiment of a node 12 are discussed in greater detail below with respect to FIG. 2.

Additionally, signal information such as wavelengths, power and quality parameters may be monitored in nodes 12 and/or by a centralized control system. Thus, nodes 12 may provide for circuit protection in the event of a line cut or other interruption in one or both of fibers 16 and 18. An optical supervisory channel (OSC) may be used by nodes 12 to communicate with each other and with the control system as discussed in greater detail below with respect to FIG. 2.

As one example of a protection scheme that may be implemented in the illustrated embodiment of network 10, a source node 12, for example node 12a, may transmit a first traffic stream to a destination node, for example node 12b, along a particular path between the source node 12a and the destination node 12b on either first fiber 16 or second fiber 18. For the purposes of illustration, this traffic stream is referred to as a "working traffic stream." If a fault occurs in the relevant fiber along the path taken by the working traffic stream or if any other event occurs that causes a disruption in the working traffic stream, the source node 12a may begin transmitting a second traffic stream, referred to here as a "protection traffic stream," along a second path between source node 12a and destination node 12b to provide the same or equivalent information as would have been provided by the working traffic stream absent the disruption. This second traffic stream may include the same or substantially similar information to that being transmitted in the working traffic stream. Moreover, source node 12a may terminate transmission of the working traffic stream along the path to the destination node 12b and may transmit only the protection traffic stream. For the purposes of this description, with respect to any working traffic stream transmitted along a first path between a source node 12 and a destination node 12, a "protection traffic stream" may refer to any transmission of traffic between the source node and destination node along a second path between the same two nodes 12 following the occurrence and/or detection of a fault on network 10.

Many previous protection schemes have required that a channel be committed to protection traffic for every channel of working traffic utilized by network 10. In certain networks, however, a fault occurring on network 10 may affect only a limited number of the traffic streams being transmitted on network 10. Thus, network 10 may only need to protect a subset of all available channels at any given time. Consequently, it may be beneficial for nodes 12 to utilize a common channel for transmitting protection traffic for multiple different traffic streams transmitted on network 10. As a result, network 10 may be able to make more efficient use of available channels. FIGS. 5A-5D illustrate, in greater detail, the operation of a particular embodiment of network 10 that supports wavelength-sharing for protection channels.

Furthermore, because the paths traveled by protection traffic streams can be relatively long, optical signals in protection traffic streams may in certain instances require regeneration. For example, in the illustrated embodiment, the source node 12 is configured to select the shorter path for transmitting the working traffic stream. For example, in the illustrated example, node 12a selects a direct path to node 12b when transmitting the working traffic stream. As a result, when the protection stream is transmitted to node 12b in the opposite direction, the protection traffic stream is transmitted on a path crossing nodes 12f, 12e, 12d, and 12c. In certain instances, this longer path is long enough to cause substantial degradation of the optical signals in the protection traffic stream and make the signals unusable upon reaching node 12e. As a result, regeneration of the working traffic stream may be desirable.

Committing a regenerator to every possible protection traffic stream may be prohibitively expensive and may not be necessary when certain channels are only occasionally used for protection traffic. Certain embodiments of node 12 may therefore include regeneration elements that can be dynamically adjusted to accept and regenerate traffic on varying channels of network 10. As a result, several channels on network 10 may be able to share regeneration components thereby reducing the number of regeneration components needed to effectively protect traffic streams transmitted on network 10. FIGS. 4A-4D illustrate, in greater detail, the operation of a particular embodiment of network 10 that utilizes a common regeneration element shared by several protection traffic streams propagated in different channels on network 10.

Figure 2:
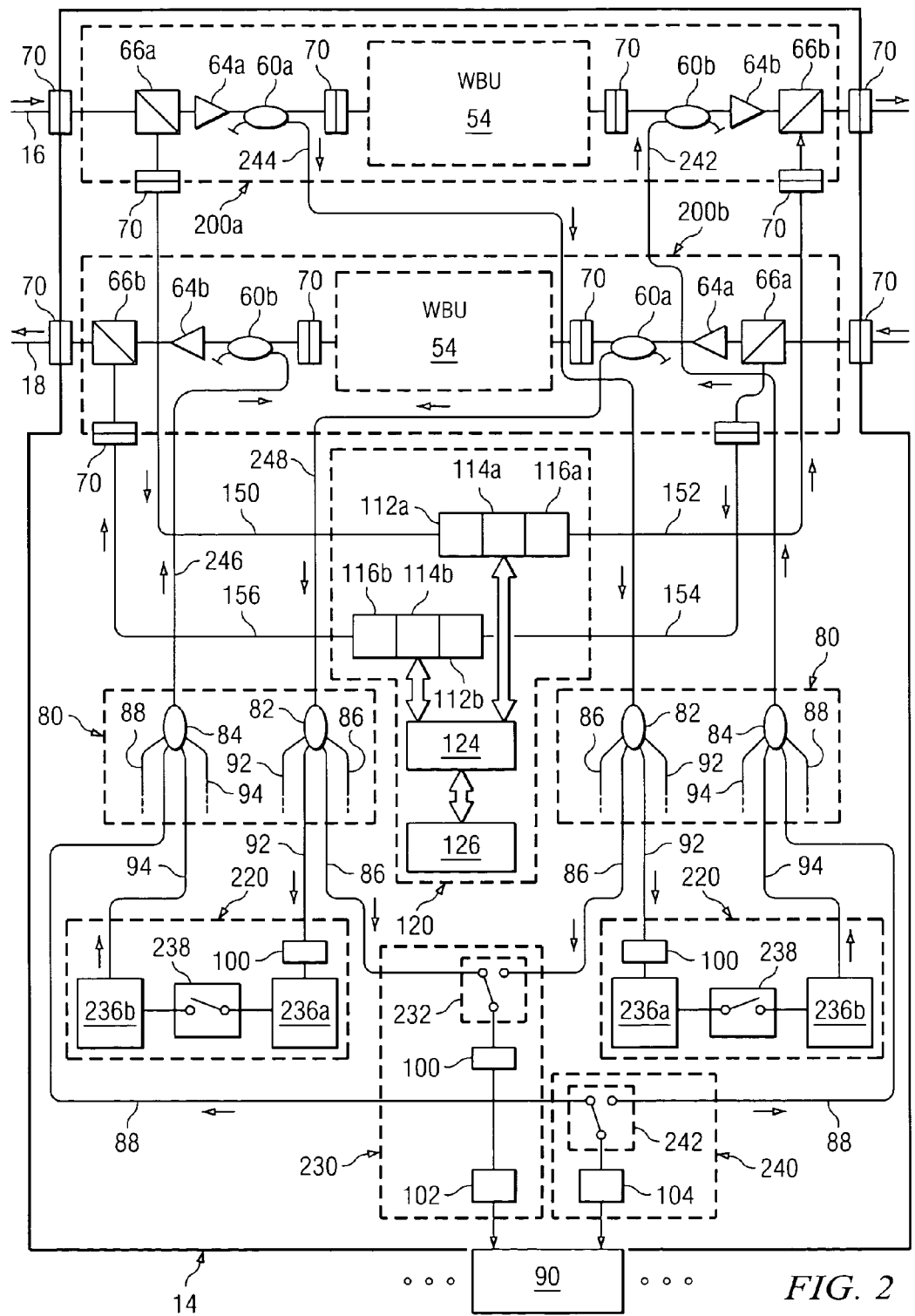
FIG. 2 is a block diagram illustrating details of a node of the network of FIG. 1, in accordance with one embodiment of the present invention.

FIG. 2 is a block diagram illustrating a particular embodiment of node 12 utilized in network 10. Node 12 may be capable of directing optical traffic propagating on fibers 16 and 18 to sub-networks, external networks, clients device, and/or other elements of network 10. Node 12 includes a transport element 200, a drop element 230, and an add element 240 coupled to each fiber 16 and 18, and a managing element 110. Additionally, one or more nodes 12 in network 10 may include suitable components for regenerating certain portions of optical signals propagated on network 10. For example, as illustrated, node 12 includes one or more regeneration elements 220.

Transport elements 200 are positioned "in-line" on fiber 16 and 18. Transport elements 200 may be used to generate one or more copies of traffic propagating on fibers 16 and 18 for use by node 12 or for communication to components coupled to node 12. Additionally, transport elements 200 may include components appropriate to add to fibers 16 and 18 traffic processed or generated by node 12 or received from client devices of node 12. For example, transport elements 200 may include one or more optical couplers 60 for forwarding optical signals from and adding optical signals to fibers 16 and 18. In the illustrated embodiment, each transport element 200 includes a coupler 60*a* which splits traffic received by transport elements 200 and forwards a copy of the traffic to regeneration element 220 and drop element 230. Furthermore, each transport element 200 includes a coupler 60*b* which adds traffic received from regeneration element 220 and/or add element 240 to the associated fiber.

Figure 3A:
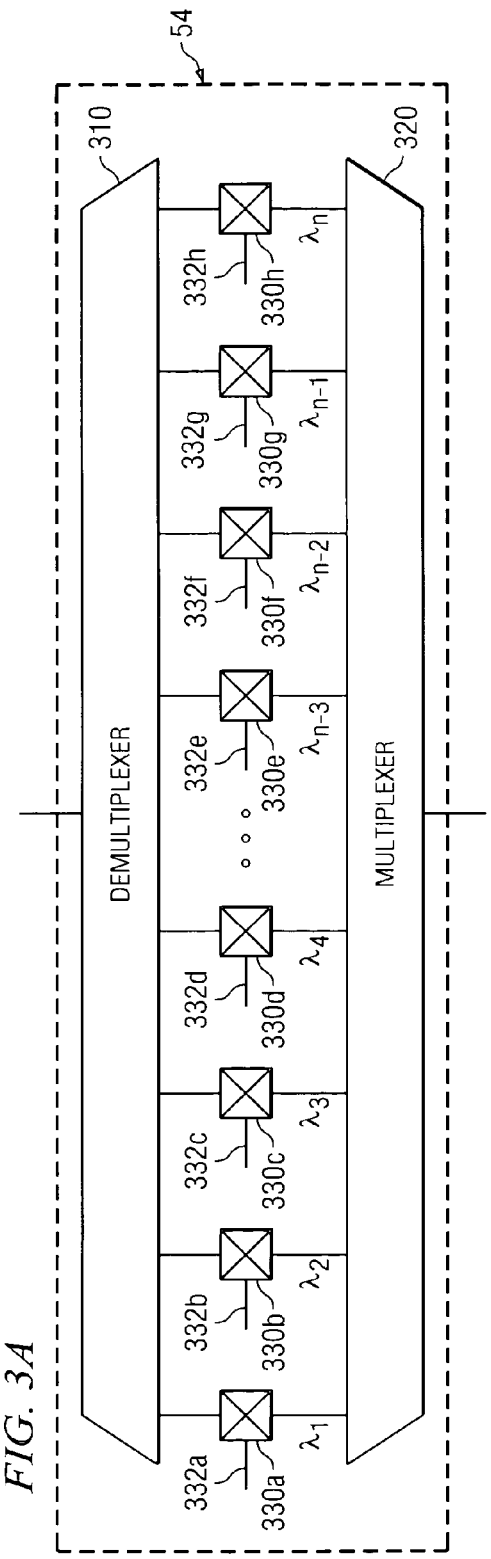
FIG. 3A is a block diagram illustrating details of a wavelength blocking unit that may be used in a particular embodiment of the node of FIG. 2.
Figure 3B:
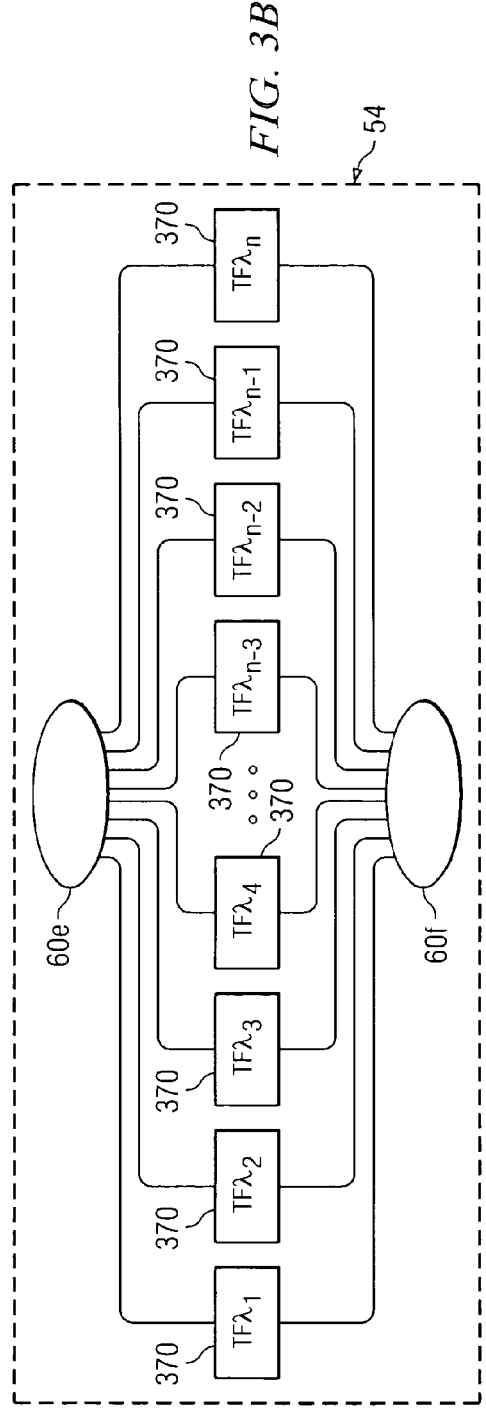
FIG. 3B is a block diagram illustrating details of an alternative embodiment of a wavelength blocking unit that may be used in a particular embodiment of the node of FIG. 2.

Each transport element 200 also includes a wavelength blocking unit (WBU) 54 configured to terminate particular wavelengths of traffic propagating on fibers 16 and 18. As a result, traffic that has already been received by the intended destination or destinations may be terminated at a subsequent node 12. Although shown as a functional block in FIG. 2, WBU 54 may represent and/or include any components configured in any appropriate manner to provide the functionality of dynamically blocking certain wavelengths and passing other wavelengths. As one example, WBU 54 may represent a structure that includes an optical demultiplexer and an optical multiplexer connected by a series of switches. An example of such a structure is shown in FIG. 3A and is described in further detail below. As another example, WBU 54 may represent a collection of tunable filters selected to allow only traffic on appropriate wavelengths to be forwarded on fibers 16 or 18. An example of such a structure is shown in FIG. 3B and is described in further detail below. As yet another example, WBU 54 may represent a wavelength-selective switch. In general, however, WBU 54 may comprise any components that are collectively operable to selectively block or forward individual channels or groups of channels.

Transport elements 200 may also include appropriate components to allow node 12 to transmit and receive information pertaining to the operation and status of fibers 16 and 18, other nodes 12, or any other appropriate elements of network 10. Node 12 may use this information to adjust the transmission of protection traffic or otherwise alter the operation of node 12 to respond to faults and other disruption occurring on network 10. In the illustrated embodiment, each transport element 200 also includes an OSC ingress filter 66*a* that processes an ingress optical signal from its respective fiber 16 or 18. Each OSC filter 66*a* filters the OSC signal from the optical signal and forwards the OSC signal to a respective OSC receiver 112. Each OSC filter 66*a* also forwards or lets pass the remaining optical signal other components of transport element 200. Each transport element 200 also includes an OSC egress filter 66*b* that adds an OSC signal from an associated OSC transmitter 116 to the optical signal from postamp 64*b* and forwards the combined signal as an egress transport signal to the associated fiber 16 or 18 of network 10. The added OSC signal may be locally generated data or may be received OSC data passed through by managing element 110.

Distributing/combining elements 80 may each comprise a drop signal splitter 82 and an add signal combiner 84. Splitters 82 may comprise a coupler connected to one optical fiber ingress lead and a plurality of optical fiber egress leads which serve as drop leads 86 or regeneration leads 92. Each drop lead 86 may be connected to a drop element 230 associated with a particular local port 90 of node 12, and each regeneration lead 92 may be coupled to a particular regeneration element 220. Although the illustrated embodiment shows a splitter 82 coupled to one drop lead 86 and one regeneration lead 92, splitter 82 may be coupled to any appropriate number of drop leads 86 and regeneration leads 92.

Splitter 82 may, in general, represent any appropriate component or collection of components capable of splitting the optical signal received by splitter 82 into a plurality of copies each to be propagated on drop leads 86 or regeneration leads 92. In particular embodiments in which four drop leads 86 are implemented, splitters 82 may each specifically comprise a 2×4 optical coupler, where one ingress lead is terminated, the other ingress lead is coupled to a coupler 60 via a fiber segment, and the four egress leads are used as drop leads 86 or regeneration leads 92.

Combiners 84 similarly may comprise a coupler with multiple optical fiber ingress leads, which serve as add leads 88 or regenerated leads 94, and one optical fiber egress lead. Each add lead 88 may be connected to an add element 240 associated with a particular local port of node 12, and each regenerated lead 94 may be coupled to a particular regeneration element 220. In particular embodiments in which combiner 84 is coupled to four ingress leads, combiner 84 may comprise a 2×4 optical coupler, where one egress lead is terminated, the other egress lead is coupled to a coupler via a fiber segment, and the four ingress leads comprise add leads 88 or regenerated leads 94. As with splitter 82, the described components of combiner 84 may be replaced by any suitable component or collection of components for combining a plurality of optical signal into a single output signal. Although the illustrated embodiment shows a combiner 84 coupled to one add lead 88 and one regenerated lead 94, combiner 84 may be coupled to any appropriate number of add leads 88 and regenerated leads 94. As shown, node 12 further comprises counterclockwise add fiber segment 242, counterclockwise drop fiber segment 244, clockwise add fiber segment 246, and clockwise drop fiber segment 248, which connect the couplers 60 to splitters 82 and combiners 84.

Regeneration elements 220 regenerate optical signals received by node 12 in selected wavelengths. In particular embodiments of node 12, these wavelengths may be selected dynamically using a tunable filter 100 associated with each regeneration element 220. Each signal regeneration unit 220 includes an optical transponder pair that includes a first transponder 236*a* and a second transponder 236*b* which may be selectively coupled by a regeneration switch 242 and may be tunable to receive and/or transmit optical signals in particular wavelengths. As a result, a particular regeneration element 220 may be operable to regenerate optical signals passed through filter 100 when regeneration switch 242 is in a closed position and forward the regenerated traffic to the associated combiner 84 to be added to fiber 16 or 18. Although FIG. 2 illustrates a particular embodiment of node 12 that includes a particular type of regeneration element 220, node 12 may alternatively or additionally include any other component suitable to regenerate traffic streams as described below. Additionally, although FIG. 2 illustrates a particular embodiment of node 12 that includes only a single regeneration element 220 for clockwise traffic and a single regeneration element 220 for counterclockwise traffic, node 12 may include any appropriate number of regeneration elements 220 for regenerating traffic in either direction.

Drop element 230 and add element 240 drop traffic from fibers 16 and 18 to a particular local port 90 and add traffic from that local port 90 to fibers 16 and 18. More specifically, drop element 230 includes a tunable filter 100 operable to pass only a selected wavelength or range of wavelengths and a receiver 102 operable to receive optical signals and generate electrical signals based on these optical signals. Add element 240 includes a tunable transmitter 104 operable to receive electrical signals from local port 90 and to transmit optical signals at a tuned wavelength.

In a particular embodiment, drop element 230 also includes a drop switch 232 that selectively couples that drop unit 230 to a drop lead 86 from a splitter 82 associated with first fiber 16 or a drop lead 86 from a splitter 82 associated with second fiber 18. Similarly, add element 240 may include an add switch 242 that selectively couples that add element 240 to an add lead 88 coupled to a combiner 84 associated with first fiber 16 or an add lead 88 coupled to a combiner 84 associated with second fiber 18. As a result, drop element 230 may selectively receive traffic from first fiber 16 or second fiber 18, and add element 240 may selectively transmit traffic to first fiber 16 or 18 to facilitate the transmission and reception of protection traffic, as described further below. Although FIG. 2 illustrates a particular embodiment of node 12 that includes only a single regeneration element 220, node 12 may include any appropriate number of regeneration elements 220. Although FIG. 2 illustrates a particular embodiment of node 12 that includes only a single drop element 230 and add element 240, node 12 may include any appropriate number of drop elements 230 and add elements 240 for adding and dropping traffic to local ports 90. In a particular embodiment, node 12 includes a drop element 230 and an add element 240 associated with each local port 90 of node 12 and operable to, respectively, drop traffic to and add traffic received from the associated local port 90.

Managing element 110 may comprise OSC receivers 112, OSC interfaces 114, OSC transmitters 116, and an element management system (EMS) 124. Node 12 also comprises OSC fiber segments 150, 152, 154, and 156, that connect managing element 110 to ingress and egress OSC filters 66. Each OSC receiver 112, OSC interface 114, and OSC transmitter 116 set forms an OSC unit for one of the fibers 16 or 18 in the node 12. The OSC units receive and transmit OSC signals for the EMS 124. The EMS 124 may be communicably coupled to a network management system (NMS) 126. NMS 126 may reside within node 12, in a different node, or external to all of the nodes 12.

EMS 124 and/or NMS 126 may comprise logic encoded in media for performing network and/or node monitoring, failure detection, protection switching and loop back or localized testing functionality of the network 10. Logic may comprise software encoded in a disk or other computer-readable medium, such as memory 120, and/or instructions encoded in an application-specific integrated circuit (ASIC), field programmable gate array (FPGA), or other processor or hardware. It will be understood that functionality of EMS 124 and/or NMS 126 may be performed by other components of the network and/or be otherwise distributed or centralized. For example, operation of NMS 126 may be distributed to the EMS 124 of nodes 12 and/or 14, and the NMS 126 may thus be omitted as a separate, discrete element. Similarly, the OSC units may communicate directly with NMS 126 and EMS 124 omitted.

EMS 124 monitors and/or controls all elements in node 12. In particular, EMS 124 receives an OSC signal from each fiber 16 and 18 in an electrical format via an OSC receiver 112 associated with that ring (the OSC receiver 112 obtains the signal via an OSC filter 66a). EMS 124 may process the signal, forward the signal and/or loop-back the signal. Thus, for example, the EMS 124 is operable to receive the electrical signal and resend the OSC signal via OSC transmitter 116 and OSC filter 66b to the next node on the fiber 16 or 18, adding, if appropriate, node-specific error information or other suitable information to the OSC.

In one embodiment, each element in node 12 monitors itself and transmits an alarm signal to EMS 124 when a failure or other problem occurs. For example, EMS 124 in node 12 may receive one or more of various kinds of alarms from the elements and components in node 12: an amplifier loss-of-light (LOL) alarm, an amplifier equipment alarm, an optical receiver equipment alarm, optical transmitter equipment alarm, or other alarms. Some failures may produce multiple alarms. For example, a fiber cut may produce amplifier LOL alarms at adjacent nodes and also error alarms from the optical receivers. In addition, the EMS 124 may monitor the wavelength and/or power of the optical signal within node 12 using an optical spectrum analyzer (OSA) communicably connected to appropriate fiber segments within node 12 and to EMS 124.

NMS 126 collects error information from all of nodes 12 in network 10 and is operable to analyze alarms and other appropriate information to determine the type and/or location of a failure. Based on the failure type and/or location, the NMS 126 determines needed protection switching actions for the network 10. The protection switch actions may be carried out by NMS 126 by issuing instructions to the EMS in one or more nodes 12. Error messages may indicate equipment failures that may be rectified by replacing the failed equipment. For example, a failure of an optical receiver or transmitter may trigger an optical receiver equipment alarm or an optical transmitter equipment alarm, respectively, and the optical receiver or transmitter replaced as necessary. EMS 124 may retune transmitters 104, filters 100 or receivers 102 of these nodes, or switch regeneration switches 238, drop switches 232, or add switches 242 of these nodes based on the error messages.

Memory 120 may be operable to store code associated with EMS 124, NMS 126, and/or other components of network 10, information specifying a wavelength assignment scheme utilized for protection traffic on network 10, and/or any other suitable information used during operation of network 10. Memory may represent one or more memory devices that are located within node 12 or that are physically separate from node 12. Additionally, memory 120 may be shared with other components of network 10 including other nodes 12. Memory 120 may represent computer disks, a hard disk memory, random access memory (RAM), read-only memory (ROM), or any other suitable storage media.

In operation, transport elements 200 are operable to add traffic to fibers 16 and 18 and to drop traffic from fibers 16 and 18. Transport elements 200 are further operable to add and drop the OSC signal to and from fibers 16 and 18. More specifically, each OSC ingress filter 66a processes an ingress optical signal from its respective fiber 16 or 18. OSC filters 66a filters the OSC signal from the optical signal and forwards the OSC signal to its respective OSC receiver 112. Each OSC filter 66a also forwards or lets pass the remaining transport optical signal to the associated amplifier 64. Amplifier 64 amplifies the signal and forwards the signal to its associated coupler 60a.

Each coupler 60a splits the signal from the amplifier 64 into two copies: a through signal that is forwarded to WBU 54 and a drop signal that is forwarded to regeneration elements 220 and/or drop elements 230 associated with the relevant transport element 200. For the purposes of this description and the following claims, two or more signals may represent copies of one another in that signals are identical or substantially identical in content, although power and/or energy levels may differ. Although the description below focuses, for the sake of simplicity, on an embodiment of node 12 that includes a single regeneration element 220, node 12 may include multiple regeneration elements 220 that each receive a copy of the local signal from a splitter 82. Moreover, each of these regeneration elements 220 may include components, such as filter 100, that isolate particular channels that the associated regeneration element 220 is responsible for regenerating. Additionally, these components may be reconfigured during operation so that a particular channel can be dynamically selected for regeneration. Similarly, node 12 may include any appropriate number of drop elements 230 each including suitable components to isolate a channel or range of channels to be forwarded to a local port associated with that drop element 230.

Thus, drop leads 236 forward copies of the signal received from coupler 60a to filters 100 of one or more regeneration element 220 or add elements 230. As described below, EMS 124 may configure the filter 100 of one or more regeneration elements 220 to pass a particular wavelength to be regenerated. The output of filter 100 (the selected wavelength) is forwarded to first transponder 236a of regeneration element 220.

First transponders 236a and second transponders 236b may each include a receiver that receives an optical signal and converts the optical signal into an electrical signal. Moreover, this receiver may be tunable or otherwise configurable so that the receiver is capable of receiving the selected wavelength passed by filter 100. Each transponder 236 also includes a transmitter that may convert the electrical signal back into an optical signal. Such an optical-electrical-optical conversion of an optical signal regenerates the signal. Alternatively, first transponders 236a and second transponder 236b may each be replaced by a single receiver and a single transmitter, respectively, where a received signal is electrically communicated from the receiver to the transmitter through appropriate configured regeneration switch 242. As yet another alternative, first transponder 236a and second transponder 236b may be replaced by a single transponder 236 and regeneration switch 242 may be omitted.

As a result, first transponder 236a receives the output of filter 100, which includes an isolated wavelength or range of wavelengths, and converts the optical signal to an electrical signal. This electrical signal may be forwarded from first transponder 236a to second transponder 236b though regeneration switch 242. Regeneration switch 242 may selectively terminate the optical signal coming from first transponder 236a or may forward the signal to second transponder 236b. In a particular embodiment, EMS 124 may adjust the position of regeneration switch 242 based on faults detected on network 10. If regeneration switch 242 is closed, second transponder 236b generates a regenerated optical signal form the electrical signal received from first transponder 236a. As described further below, the regenerated optical signal may be transmitted in the same wavelength as the original optical signal or in a different wavelength, depending on the configuration of regeneration element 220.

After being regenerated, the regenerated optical signal is transmitted by second transponder 236b via regenerated lead 94 to coupler 60b of the transport element 200 associated with that regeneration element 220. As noted above, node 12 may include any number of regeneration elements 220 configured to regenerate any appropriate number and combination of dynamically-selected channels. If node 12 includes multiple regeneration elements 220 for traffic on each of fiber 16 and 18, combiner 84 may combine different wavelengths/channels from second transponders 236b of the multiple regeneration elements 220 and forward the combined optical signal to coupler 60b of the associated transport element 200. As a result, node 12 may simultaneously regenerate multiple different channels propagating on fibers 16 and 18.

Meanwhile, traffic may be dropped to local ports 90 or added from local ports 90 by drop elements 230 or add elements 240, respectively. In a particular embodiment, node 12 includes a drop element 230 coupled to each local port 90 and responsible for selectively dropping traffic from first fiber 16 and second fiber 18 to that particular local port 90. Drop element 230 selectively couples to first fiber 16 or second fiber 18 based on the position of a drop switch 232. More specifically, drop switch 232 selectively couples drop element 230 to a drop lead 86 from a splitter 82 associated with first fiber 16 or a drop lead 86 from a splitter 82 associated with second fiber 18. As a result, drop element 230 may selectively receive traffic from first fiber 16 or second fiber 18. For example, EMS 124 may control the configuration of drop switch 232 and adjust the position of drop switch to couple drop element 230 to first fiber 16 or second fiber 18 as appropriate to switch between working traffic streams and protection traffic streams transmitted on the two fibers.

Drop elements 230 further include a tunable filter 100 operable to pass only a selected wavelength or range of wavelengths and a receiver 102 operable to receive optical signals and generate electrical signals based on these optical signals. Receiver 102 may represent a tunable receiver operable to allow a dynamically determined wavelength to pass through filter 100 while terminating all other wavelengths within the optical signal. Thus, in response to detecting a fault on a particular fiber, EMS 124 may tune filter 100 and, if appropriate, receiver 102 for a particular drop element 230 to allow the associated local port to receive protection traffic streams on a different wavelength from that on which working traffic streams are currently being received by that local port 90. In such a case, EMS 124 may also adjust the position of drop switch 232 to couple the relevant filter 100 and receiver 102 to the other fiber. Similarly, EMS 124 may retune filter 100 and receiver 102 to previous settings once the fault is corrected so that local port 90 may return to receiving working traffic streams. EMS 124 may also adjust the position of drop switch 32 to couple filter 100 and receiver 102 to the fiber to which these components were originally coupled.

Similarly, add elements 240 selectively couple each local port 90 to first fiber 16 or second fiber 18 based on the position of add switch 242. More specifically, each add element 240 includes an add switch 242 that selectively couples that add element 240 to an add lead 88 from a combiner 84 associated with first fiber 16 or an add lead 88 from a combiner 84 associated with second fiber 18. As a result, add element 240 may selectively add traffic to first fiber 16 or second fiber 18. For example, in the illustrated embodiment, EMS 124 controls the configuration of add switch 242 and adjusts the position of add switch 242 to couple add unit 240 to first fiber 16 or second fiber 18 as appropriate to switch between transmitting in a first direction on one fiber to transmitting in a second direction on the other fiber. For example, EMS 124 may switch add switch 242 as appropriate to transition an add element 240 from transmitting a working traffic stream on one fiber to transmitting a protection traffic stream on the other fiber.

Add elements 240 further include a tunable transmitter 104 operable to receive electrical signals from an associated local port 90 and to transmit optical signals at a desired wavelength. Furthermore, EMS 124 may control the tuned wavelength of transmitter 104. Thus, in response to detecting a fault, EMS 124 may tune transmitter 104 to transition transmitter 104 form transmitting traffic in a wavelength associated with working traffic to a wavelength associated with protection traffic (if those wavelengths differ). Similarly, EMS 124 may retune transmitter 104 to a previous setting once the fault is corrected so that node 12 may return to transmitting traffic from the associated local port 90 in the wavelength associated with working traffic streams.

Returning to the operation of couplers 60a, in addition to forwarding the drop signal as described above, each coupler 60a forwards the through signal to its respective WBU 54. WBUs 54 receive the optical signal and selectively terminate or forward channels of the through signal. In particular embodiments, WBU 54 terminates wavelengths/channels associated with traffic from local ports 90 of node 12 and/or any external networks or subnetworks of network 10 coupled to node 12. WBU 54 combines the forwarded channels to from an output signal that is forwarded to coupler 60c.

Each coupler 60b combines traffic from the associated combiner 84 with the output of WBU 54 and forwards the resulting signal to OSC egress filter 66b. As noted above, the traffic received from combiner 84 may include both regenerated traffic being returned to the relevant transport element 200 and locally-derived traffic received by add elements 240. After coupler 60b adds regenerated and/or locally-derived traffic to the output of WBU 54, coupler 60b forwards the combined signal to the associated OSC egress filter 66b. Each OSC egress filter 66b adds an OSC signal from the associated OSC transmitter 116 to the combined optical signal and forwards the new combined signal as an egress transport signal to the associated fiber 16 or 18 of network 10. The added OSC signal may be locally generated data or may be received OSC data forwarded through by the EMS 124.

FIG. 3A illustrates one embodiment of WBU 54. In particular, FIG. 3A illustrates an embodiment of WBU 54 that includes a series of switches 330 capable of selectively terminating or passing particular wavelengths of incoming traffic to WBU 54. In the illustrated embodiment, WBU 54 includes a demultiplexer 310, a multiplexer 320, and a plurality of switches 330.

In operation, demultiplexer 310 receives optical signals input to WBU 54, for example, from coupler 60a of node 12. Demultiplexer 310 demultiplexes the signal into its constituent channels. Switches 330 may be dynamically configured to selectively terminate or forward each channel to multiplexer 320 based on control signals received by each switch 330 on an associated control line 332. The channels that are forwarded by switches 330 are received by multiplexer 320, which multiplexes the received channels into a WDM optical signal and forwards the optical signal to downstream elements. Consequently, wavelengths may be selectively terminated or forwarded to terminate traffic not to be forwarded to components downstream from WBU 54. For example, switches 330 may be configured to terminate traffic on particular wavelengths reserved for use by traffic collected at a particular node 12 in which WBU 54 is located. As a result, nodes 12 may add traffic on one of these terminated wavelengths without interference from upstream traffic.

FIG. 3B illustrates an alternative embodiment of WBU 54 that utilizes one or more couplers 60 in place of demultiplexer 310 and multiplexer 320 and a collection of tunable filters 370 instead of switches 330. In particular, the illustrated embodiment of WBU 54 includes a first coupler 60e, a second coupler 60f, and a plurality of tunable filters 370. Each tunable filter 370 is tuned to propagate a particular wavelength, or range of wavelengths, of traffic and to terminate all other wavelengths or ranges of wavelengths.

In operation, coupler 60e receives optical signals input to WBU 54, for example, from coupler 60a of node 12. Coupler 60e splits the optical signals into a plurality of copies and transmits each of these copies to a particular tunable filter 370. Although couplers 60e and 60f are both shown as a single coupler, both coupler 60e and 60f may, in a particular embodiment of WBU 54 comprise one or more couplers cascaded to generate multiple copies of the optical signals input to WBU 54.

Each tunable filter 370 selectively passes traffic propagating at a particular wavelength or within a particular range of wavelengths and blocks traffic propagating at all other wavelengths. Each tunable filter 370 then forwards the passed traffic propagating at the associated wavelength or wavelengths to coupler 60f. Coupler 60f combines the output of each tunable filter 370 and forwards these signal to, for example, optical coupler 60b of node 12 which is coupled to WBU 54 in a particular embodiment of node 12. Consequently, only wavelengths matching the "tuning" of one or more filters 370 will pass through the series of filters 270 and wavelengths may be selectively terminated or forwarded on the fiber 16 or 18 to which WBU 54 is coupled.

FIGS. 4A-4D illustrate operation of a particular embodiment of the network illustrated in FIG. 1 to regenerate a first optical traffic stream and a second optical traffic stream propagating in different wavelengths on the network. More specifically, FIGS. 4A-4D illustrate operation of a particular node 12 in regenerating, at appropriate times, a plurality of traffic streams using a shared regeneration element 220. In particular, FIGS. 4A-4D illustrate operation of network 10 as node 12d regenerates a first traffic stream propagating at a first wavelength and then, using the same regeneration element 220, regenerates a second traffic stream propagating at a second wavelength. As noted above, because regeneration element 220 can be configured dynamically to allow for regeneration of any suitable traffic stream by a common regeneration element 220 included in a node 12, particular embodiments of network 10 may provide for more efficient use of system resources.

Figure 4A:
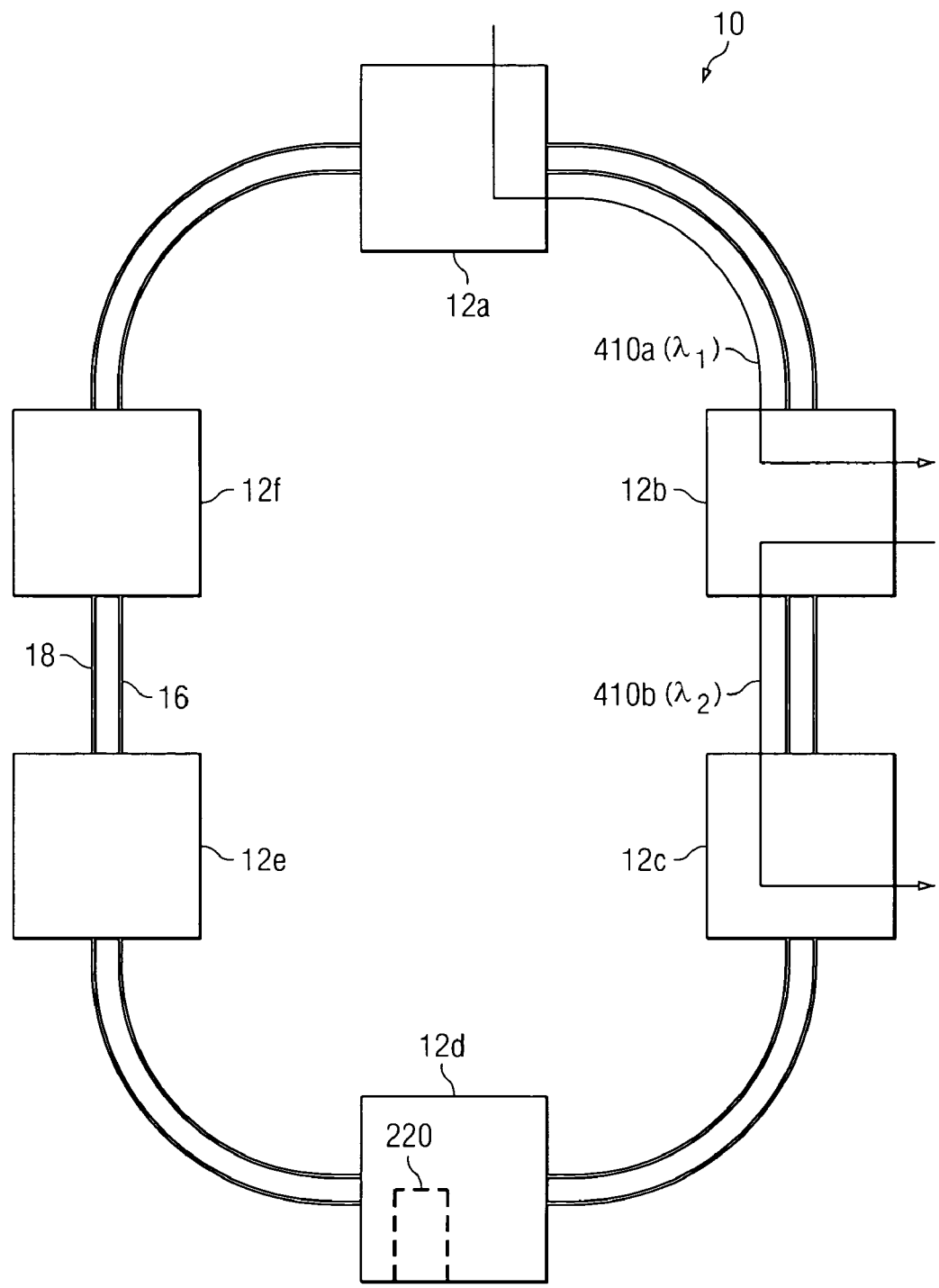
FIGS. 4A-4D illustrate operation of a particular embodiment of the network illustrated in FIG. 1 in regenerating a first optical traffic stream and a second optical traffic stream propagating in different wavelengths on the network.

FIG. 4A illustrates an example of the operation of the embodiment of network 10, shown in FIG. 1, according to an initial configuration. As shown, node 12d includes one or more regeneration elements 220 as described above with respect to FIG. 2. Network 10 may, however, include any appropriate number of nodes 12 that include regeneration elements 220.

In the illustrated example, node 12a transmits a traffic stream to node 12b clockwise along first fiber 16 carrying signals generated by node 12a or received by node 12a at a local port 90 of node 12a. Node 12a transmits this traffic stream in a wavelength, assumed here to be $\lambda_1$, that is associated with node 12b or a particular local port 90 of node 12b. Node 12a may determine this wavelength in any appropriate manner. For the purposes of this description and the claims that follow, this traffic stream is referred to as a "working traffic stream 410" or, specifically, working traffic stream 410a. In the illustrated example, node 12b also transmits a working traffic stream 410b to node 12c clockwise along first fiber 16 carrying signals received at a source local port 90 of node 12b. Node 12a transmits this working traffic stream 410b in a particular wavelength, assumed here to be $\lambda_2$. In a particular embodiment, working traffic streams 410 may all transmitted by the associated node 12 and added to a WDM or DWDM signal propagating on first fiber 16 or second fiber 18, as appropriate.

Node 12b receives an optical signal on first fiber 16 that includes working traffic stream 410a. Node 12b forwards the optical signal, including working traffic stream 410a, to one or more drop elements 230 of node 12b, as described above with respect to FIG. 2. One or more destination drop elements 230 for working traffic stream 410a may be configured to receive traffic from first fiber 16 in the wavelength at which working traffic stream 410a was transmitted, $\lambda_1$. More specifically, a tunable filter 100 of a particular drop element 230 may be tuned to pass traffic propagating in the wavelength of working traffic stream 410a, $\lambda_1$, and a receiver 102 of that drop element 230 may be tuned to receive traffic propagating in $\lambda_1$ and convert the optical signals of that traffic into electrical signals for use by node 12b or components coupled to node 12b.

Similarly, node 12c receives an optical signal on first fiber 16 that includes working traffic stream 410b and forwards the optical signal, including working traffic stream 410b, to one or more drop elements 230 of node 12c. One or more drop elements 230 of node 12c may be configured to receive traffic from first fiber 16 in the wavelength at which working traffic stream 410b was transmitted, $\lambda_2$. As a result, working traffic stream 410b may pass through a filter 100 associated with a particular drop element 230 of node 12c and a transmitter 104 associated with that drop element 230 may convert the optical signals of that traffic into electrical signals for use by node 12b or components coupled to node 12b.

Figure 4B:
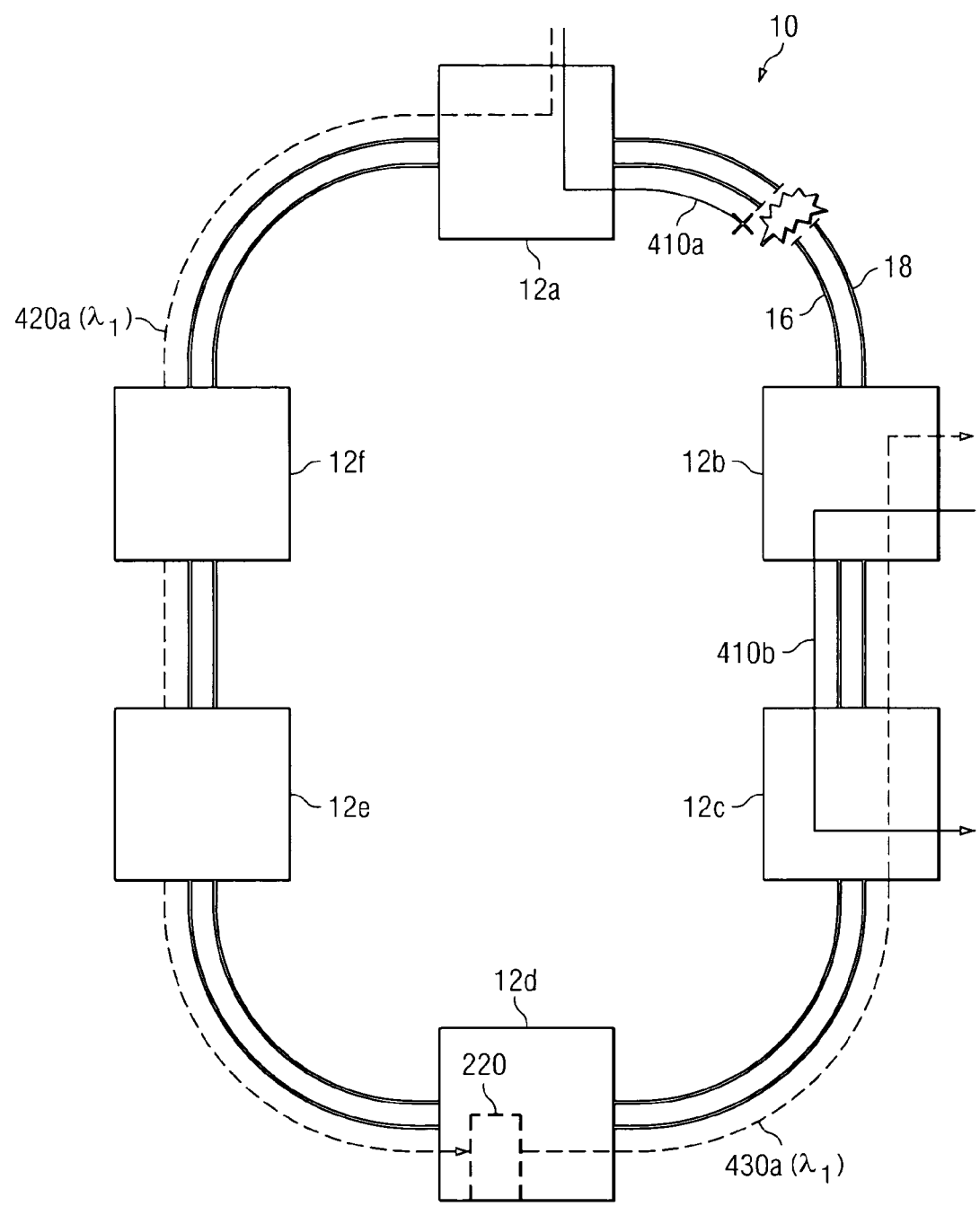

FIG. 4B illustrates operation of network 10 following a fault or other occurrence that disrupts the transmission of working traffic stream 410a from node 12a to node 12b. In the illustrated embodiment of network 10, an appropriate element of network 10 detects the fault and communicates information regarding the fault to one or more nodes 12 in network 10. For example, an EMS 124 of node 12b may detect a loss-of-light (LOL) signal resulting from the termination of one or more optical signals being received by node 12b. Node 12b then communicates information regarding the fault to an NMS 126 of network 10, and NMS 126, in turn, sends appropriate components of network 10, including node 12a and/or 12b, an error message indicating that a fault has occurred between node 12a and node 12b. In general, however, appropriate components of network 10 may detect the fault in any suitable manner and may disseminate information pertaining to the fault to appropriate components in any suitable manner.

In response to the fault, in the illustrated embodiment of network 10, node 12a begins transmitting protection traffic to replace working traffic stream 410a. More specifically, node 12a transmits a protection traffic stream 420a to node 12b in a counterclockwise direction on second fiber 18. Node 12a transmits this protection traffic stream 420a at a wavelength associated with protection traffic generated for working traffic stream 410a, assumed here to be $\lambda_1$.

In particular embodiments, protection traffic stream 420a, as a result of traversing the distance between node 12a and node 12b in the counterclockwise direction along fiber 18, may be so degraded as to be unusable at node 12b. As a result, node 12d may, in response to the fault, also configure a particular regeneration element 220 of node 12 that is associated with fiber 18 to regenerate protection traffic stream 420a. In a particular embodiment of node 12d, node 12d may close regeneration switch 242 of the relevant regeneration element 220 (if regeneration switch 242 is not already closed), thereby coupling first transponder 236a and second transponder 236b. Node 12d may also tune filter 100 of regeneration element 220 to allow signals propagating at a wavelength of $\lambda_1$ to pass to first transponder 236a of regeneration element 220. Similarly, node 12d may tune first transponder 236a, if appropriate, to receive signals of wavelength $\lambda_1$.

In a particular embodiment, node 12d may also tune second transponder 236b of regeneration element 220, as part of reconfiguring regeneration element 220 in response to the fault, so that second transponder 236b transmits regenerated traffic stream 430a at the same wavelength as protection traffic stream 420a was transmitted, or $\lambda_1$. In an alternative embodiment, second transponder 236b of regeneration element 220 transmits all regenerated traffic at a predetermined wavelength, $\lambda_R$. As a result, such alternative embodiments may use simpler components for second transponder 236b that may or may not be tunable or that may require a non-trivial amount of time to tune. This may allow cheaper, fewer, or less complex components to be used in regeneration element 220.

As a result of this reconfiguration, first transponder 236a of regeneration element 220 receives protection traffic stream 420a and generates an electrical signal based on protection traffic stream 420a. First transponder 236a transmits this electrical signal to second transponder 236b through regeneration switch 242. Second transponder 236b, in turn, begins transmitting a regenerated traffic stream 430a based on the electrical signal received from first transponder 236a. The content of regenerated traffic stream 430 is identical or substantially identical to the content of protection traffic stream 420, but the signal strength of regenerated traffic stream 430 is greater than the signal strength of protection traffic stream 420a. Thus, the signal strength of regenerated traffic stream 430a may be sufficiently strong for node 12b to receive and use regenerated traffic stream 430a despite the total distance traversed by protected traffic stream 420a and regenerated traffic stream 430a.

Additionally, in response to the fault, node 12b reconfigures the drop element 230 of node 12b that was receiving working traffic stream 410a prior to the fault so that the receiver 102 associated with that drop element 230 receives traffic from second fiber 18. In particular, node 12b switches regeneration switch 242 of the relevant drop element 230 to couple that drop element 230 to second fiber 18. This reconfiguration may also involve, if appropriate, retuning filter 100 and receiver 102 of the relevant drop element 230 to receive traffic in the wavelength in which regenerated traffic stream 430a was transmitted.

As a result of the reconfiguration, regenerated traffic stream 430a passes through filter 100 associated with the drop element 230 that was previously receiving working traffic stream 410a, and a transmitter 104 associated with that drop element 230 converts the optical signals of that traffic into electrical signals for use by node 12b or components coupled to node 12b. Thus, node 12b receives traffic transmitted by node 12a despite the fault in fiber 16. Additionally, because of the regeneration of the protected traffic, node 12b receives the traffic at a signal strength sufficient for use by node 12b.

Figure 4C:
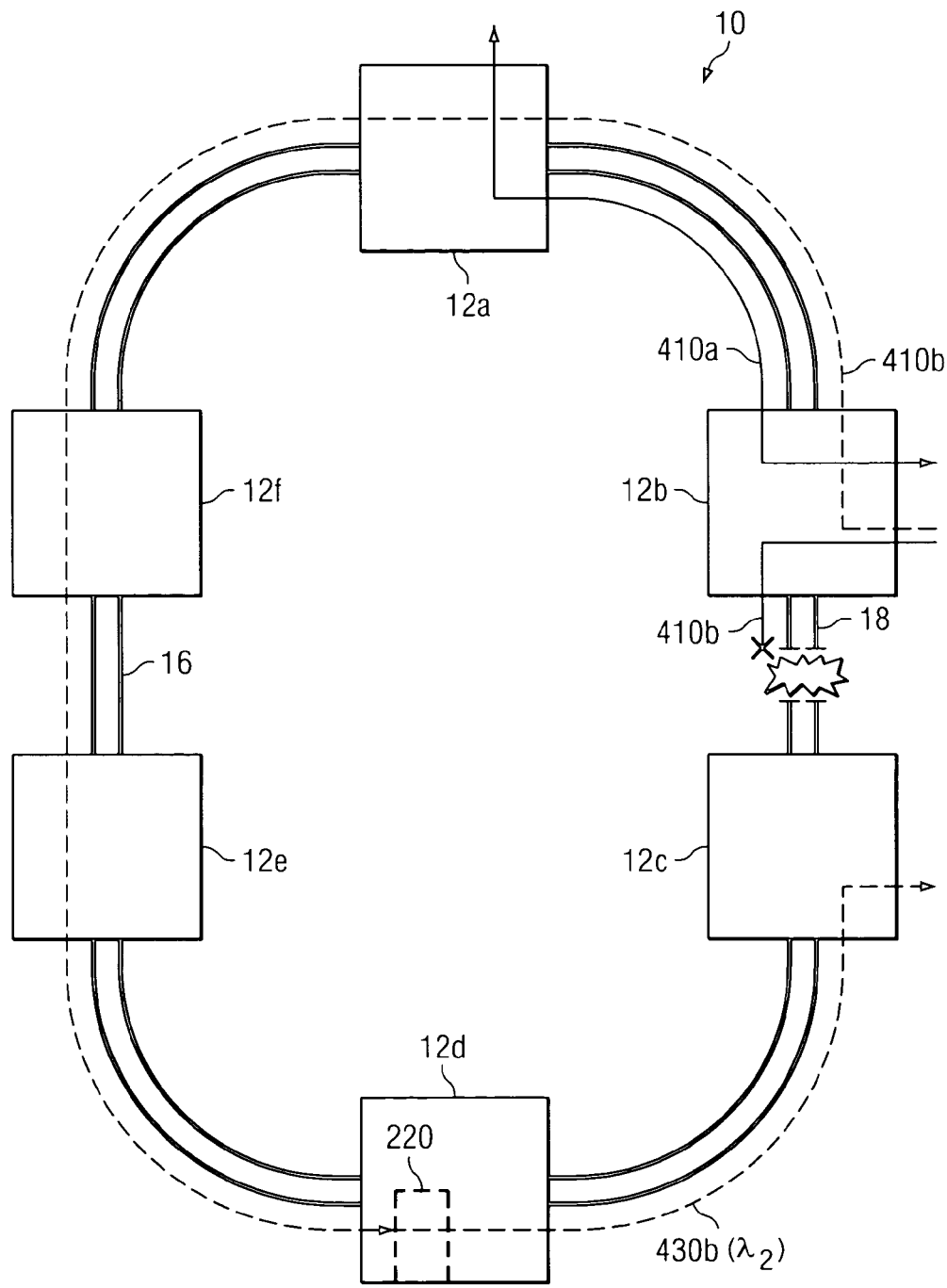

FIG. 4C illustrates operation of network 10 following a second fault that disrupts the transmission of traffic on fiber 16 between node 12b and 12c. As noted above, for the sake of simplicity, network 10 is assumed to be susceptible to only one fault at any given time. Consequently, this second fault is assumed to occur following any appropriate remedial action taken to correct the first fault and/or any other previous faults.

In the illustrated embodiment of network 10, the EMS of node 12c detects a loss-of-light (LOL) signal resulting from the termination of one or more optical signals being received by node 12c. Node 12c then communicates information regarding the fault to an NMS of network 10, and NMS, in turn, sends appropriate components of network 10, including node 12b and/or 12c, an error message indicating that a fault has occurred between node 12b and node 12c. In general, however, appropriate components of network 10 may detect the fault in any suitable manner and may disseminate, in any suitable manner, information pertaining to the fault to other appropriate components of network 10.

In response to the second fault, in the illustrated embodiment of network 10, node 12*b* begins transmitting protection traffic associated with working traffic stream 410*b*. More specifically, node 12*b* transmits a protection traffic stream 420*b* to node 12*c* in a counterclockwise direction on second fiber 18. Node 12*b* transmits this protection traffic stream 420*b* at a predetermined wavelength associated with protection traffic transmitted for working traffic stream 410*b*, $\lambda_2$. Protection traffic stream 420*b* includes identical or substantially identical information to working traffic stream 410*b*.

Node 12*d* may, in response to the second fault, also reconfigure regeneration element 220 to regenerate protection traffic stream 420*b*. In particular, node 12*d* may tune filter 100 of regeneration element 220 to allow signals propagating at a wavelength of $\lambda_2$ to pass to first transponder 236*a* of regeneration element 220. Node 12*d* closes regeneration switch 242, if appropriate, to allow signals from first transponder 236*a* to propagate to second transponder 236*b*. Similarly, node 12*d* may reconfigure first transponder 236*a*, if appropriate, to receive signals of wavelength $\lambda_2$. As a result, first transponder 236*a* of regeneration element 220 receives protection traffic stream 420*b* and generates an electrical signal based on protection traffic stream 420*b*. First transponder 236*a* transmits this electrical signal to second transponder 236*b* through regeneration switch 242.

In a particular embodiment, node 12*d* may also tune second transponder 236*b* of regeneration element 220, as part of reconfiguring regeneration element 220 in response to the second fault, so that second transponder 236*b* transmits regenerated traffic stream 430*b* at the same wavelength as protection traffic stream 420*b* was transmitted, or $\lambda_2$. As noted above, in an alternative embodiment, second transponder 236*b* of regeneration element 220 may transmit all regenerated traffic at a predetermined wavelength, $\lambda_R$. As a result, such alternative embodiments may use components for second transponder 236*b* that may or may not be tunable.

Second transponder 236*b* of regeneration element 220 begins transmitting a regenerated traffic stream 430*b* based on the electrical signal received from first transponder 236*a*. The content of regenerated traffic stream 430*b* is identical or substantially identical to the content of protection traffic stream 420*b*, but the signal strength of regenerated traffic stream 430*b* is greater than the signal strength of protection traffic stream 420*b*. Thus, the signal strength of regenerated traffic stream 430*b* may be sufficiently strong for node 12*b* to receive and use regenerated traffic stream 430*b* despite the total distance traversed by protected traffic stream 420*b* and regenerated traffic stream 430*b*.

Additionally, in response to the second fault, node 12*c* reconfigures the drop element 230 of node 12*c* that was receiving working traffic stream 410*b* prior to the second fault so that the receiver 102 associated with that drop element 230 receives traffic from second fiber 18. In particular, node 12*b* switches regeneration switch 242 of the relevant drop element 230 to couple that drop element 230 to second fiber 18. This reconfiguration may also involve, if appropriate, retuning filter 100 and receiver 102 of the relevant drop element 230 to receive traffic in the wavelength in which regenerated traffic stream 430*b* was transmitted.

As a result of the reconfiguration, regenerated traffic stream 430*b* passes through a filter 100 associated with the drop element 230 that was previously receiving working traffic stream 410*b*, and a transmitter 104 associated with that drop element 230 converts the optical signals of that traffic into electrical signals for use by node 12*c* or components coupled to node 12*c*. Thus, node 12*c* receives information transmitted by node 12*b* despite the second fault in fiber 16. Additionally, because of the regeneration of the protected traffic, node 12*c* receives the information at a signal strength sufficient for use by node 12*c*.

Figure 4D:
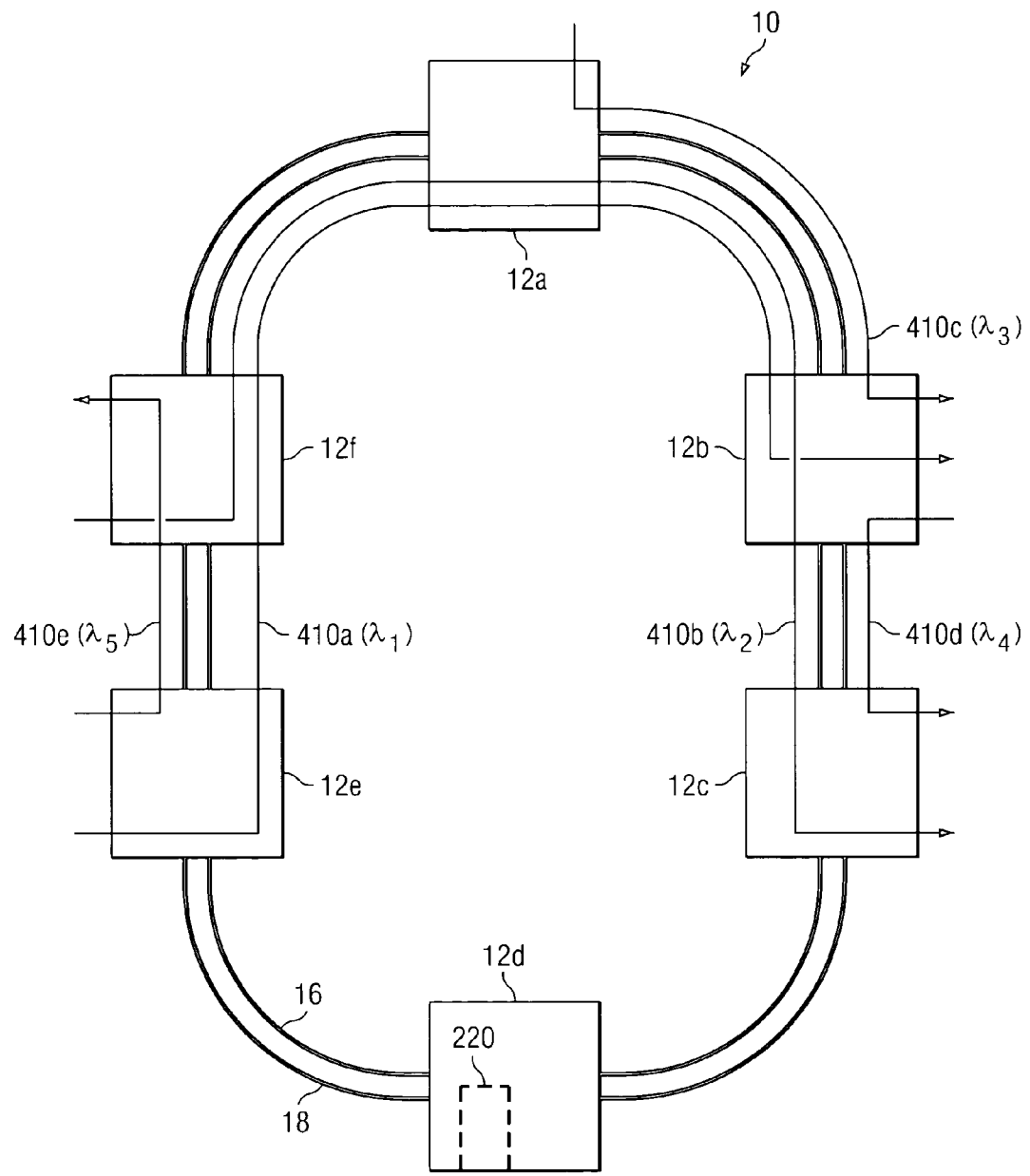

Thus, regeneration element 220 in particular embodiments of node 12 may be reconfigured during operation with the wavelength to be regenerated by regeneration element 220 determined dynamically. Because regeneration element 220 is operable to be reconfigured during operation to receive and regenerate any of multiple wavelengths, network 10 may be able to use a common regeneration element 220 for regenerating these multiple wavelengths. This may reduce the number of regeneration elements 220 needed to support regeneration for a given number of channels on network 10. In particular, assuming no more than one fault affects network 10 at any given time, network 10 may be capable of supporting regenerated protection traffic streams 420 for all working traffic streams 410 being transmitted on network 10 using a number of regenerating elements 220 equal to the maximum number of wavelengths utilized by working traffic streams 410 on any span of network 10. For the purposes of this description, a "span" represents the portions of both fiber 16 and 18 connecting any two adjacent nodes 12 of network 10. FIG. 4D below provides an example that illustrates this point in greater detail.

FIG. 4D illustrates operation of network 10 while generating five working traffic streams 410*a*-*e*. In this example, the maximum number of wavelengths utilized for working traffic streams 410 in any one span of network 10 is three (between nodes 12*a* and 12*b*). Thus, in this example, network 10 could support regenerated protection traffic streams 420 for any working traffic streams 410 affected by a particular fault with only three regeneration elements 220, regardless of where the fault occurred.

Although FIGS. 4A-4D illustrate operation of network 10 in regenerating protection traffic streams 420, the described techniques may be applied to any appropriate traffic stream transmitted on network 10. For example, in a particular embodiment of network 10, a source node 12 and a destination node 12 may be separated by a significant distance. In such an embodiment, both working traffic streams 410 and protection traffic streams 420 may be regenerated along their respective paths between the source node 12 and the destination node 12, and/or working traffic streams 410 may be regenerated instead of protection traffic streams 420. Moreover, while these regeneration techniques are described with respect to a particular protection scheme, the described regeneration techniques may be implemented in a particular network 10 that utilizes a different protection scheme or no protection scheme whatsoever. In general, the described regeneration techniques may be utilized by any suitable embodiment of network 10 to regenerate any appropriate signals transmitted on that network 10.

FIGS. 5A-5D illustrate operation of a particular embodiment of the network illustrated in FIG. 1 in transmitting traffic streams to protect a first optical traffic stream and a second optical traffic stream propagating in different wavelengths on the network. As illustrated in FIGS. 5A-5D, any particular node 12 may or may not include regeneration element 220. Network 10, in the illustrated embodiment, supports a wavelength-sharing protection scheme for working traffic streams 510 transmitted on network 10. More specifically, nodes 12 are dynamically configurable to receive traffic at any available wavelength. As a result, nodes 12 can transmit protection traffic streams 520 on a common wavelength for a plurality of working traffic streams 510. Thus, nodes 12 are not required to devote a separate wavelength exclusively to a protection traffic stream 520 for each working traffic stream 510 transmitted. Instead, nodes 12 may be able to protect working traffic streams 510 by transmitting protection traffic streams 520 in one or more shared protection wavelengths.

In a particular embodiment, nodes 12 transmit working traffic streams 510 in any of a plurality of wavelengths supported by network 10. The wavelengths in which working traffic streams 510 are transmitted are referred to here as "working wavelengths." The working wavelength in which a particular working traffic stream 510 is transmitted may be determined in any appropriate manner. For example, in a particular embodiment, a particular source node 12 transmits a particular working traffic stream 510 in a particular working wavelength based on the destination node 12 of that working traffic stream 510.

Furthermore, working wavelengths may be grouped together in one or more assignment groups, with each assignment group assigned a "protection wavelength." As a result of this assignment, a protection traffic stream 520 transmitted to replace a particular working traffic stream 510 will be transmitted at a wavelength determined based on the protection wavelength associated with the relevant working traffic stream 510. Although, in particular embodiments of network 10, only one working traffic stream 510 within a particular assignment group may be protected at any given time, nodes 12 may, in response to faults occurring on network 10, be reconfigured to transition between protecting a first working traffic stream 510 using a protection traffic stream 520 transmitted at a particular wavelength and protecting a second working traffic stream 510 using a protection traffic stream 520 transmitted at the same wavelength. FIGS. 5A-5D provide an example to explain this process in greater detail.

Figure 5A:
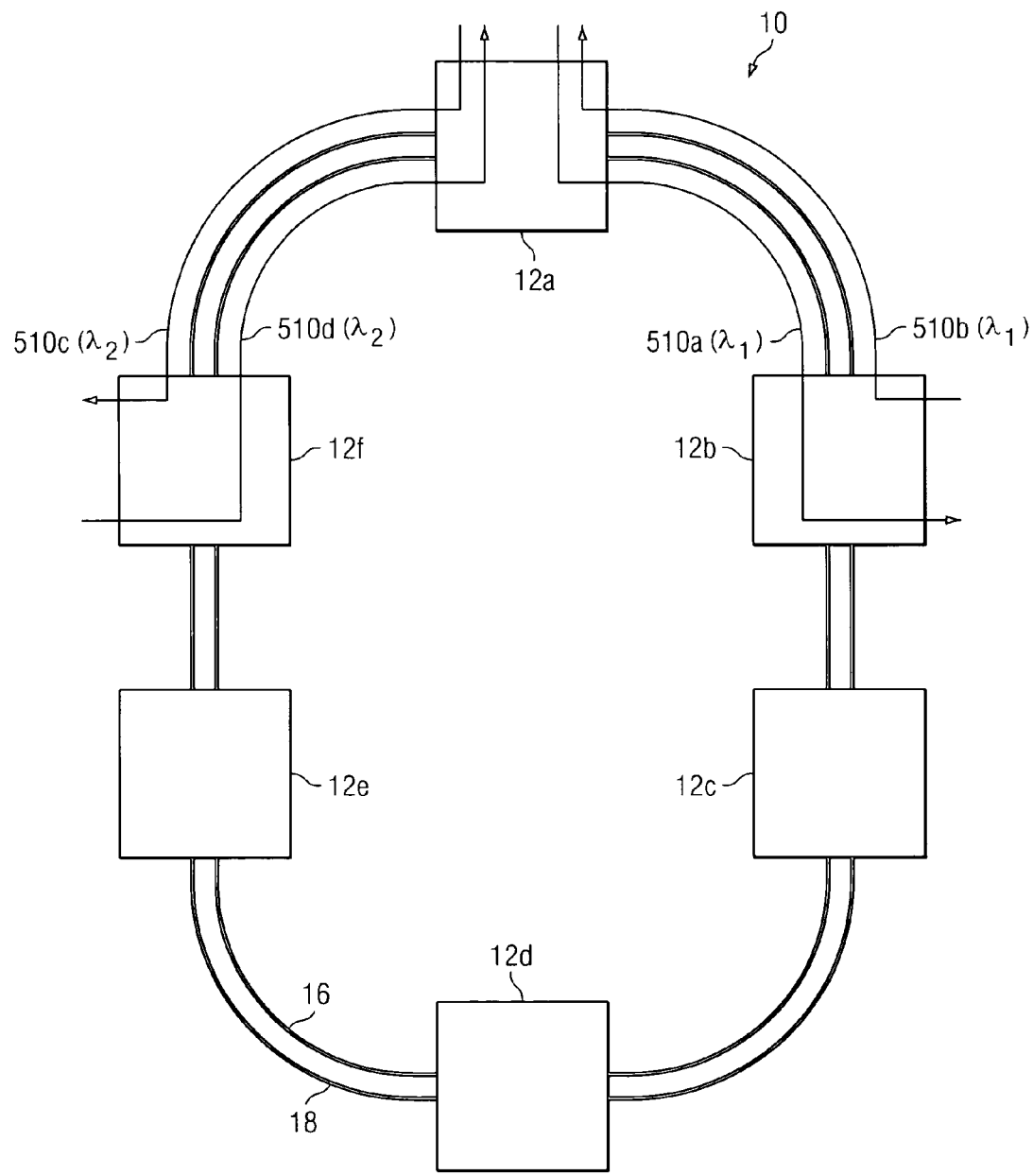
FIGS. 5A-5D illustrate operation of a particular embodiment of the network illustrated in FIG. 1 implementing a protection scheme that utilizes shared wavelengths.

FIG. 5A illustrates an example of the operation of an embodiment of network 10 according to an initial configuration that includes nodes 12a-e. In the illustrated example, network 10 uses both first fiber 16 and second fiber 18 to propagate working traffic streams 510. Thus, working traffic streams 510 may be transmitted both in the clockwise and counterclockwise directions in this example embodiment of network 10. Protection traffic streams 520, in this example embodiment, are transmitted in the opposite direction from the associated working traffic stream 510. Additionally, working traffic streams 510 and protection traffic streams 520 are transmitted by the relevant node 12 and added, as appropriate, to a WDM or DWDM signal propagating on first fiber 16 or second fiber 18.

In the illustrated example, node 12a transmits a working traffic stream 510 a to node 12b clockwise along first fiber 16 carrying signals generated by node 12a or received by node 12a at a local port 90 of node 12a. Node 12a transmits this traffic stream in a wavelength, assumed here to be $\lambda_1$, that is associated with node 12b or a particular local port 90 of node 12b. Node 12a may determine this wavelength in any appropriate manner. In the illustrated example, node 12b also transmits a working traffic stream 510b to node 12a counterclockwise along second fiber 18 based on signals generated by node 12b or received at a source local port 90 of node 12b. Node 12b transmits this working traffic stream 510b at a wavelength determined in any appropriate manner, assumed here to be $\lambda_1$.

Additionally, in this example, node 12a concurrently transmits working traffic stream 510c to node 12f counterclockwise along second fiber 18 based on signals received at a local port 90 of node 12a. Node 12f also transmits working traffic stream 510d to node 12a clockwise along first fiber 16 based on signals received at a local port 90 of node 12f.

Node 12b receives an optical signal on first fiber 16 that includes working traffic stream 510a. Node 12b forwards the optical signal, including working traffic stream 510a, to one or more drop elements 230 of node 12b, as described above with respect to FIG. 2. One or more destination drop elements 230 for working traffic stream 510a may be configured to receive traffic from first fiber 16 in the wavelength at which working traffic stream 510a was transmitted, $\lambda_1$. More specifically, a tunable filter 100 of a particular drop element 230 may be tuned to pass traffic propagating in the wavelength of working traffic stream 510a, $\lambda_1$, and a receiver 102 of that drop element 230 may be tuned to receive traffic propagating in $\lambda_1$ and convert the optical signals of that traffic into electrical signals for use by node 12b or components coupled to node 12b. Nodes 12b, 12f, and 12a receive working traffic streams 510b, 510c, and 510d, respectively, in a similar manner.

Figure 5B:
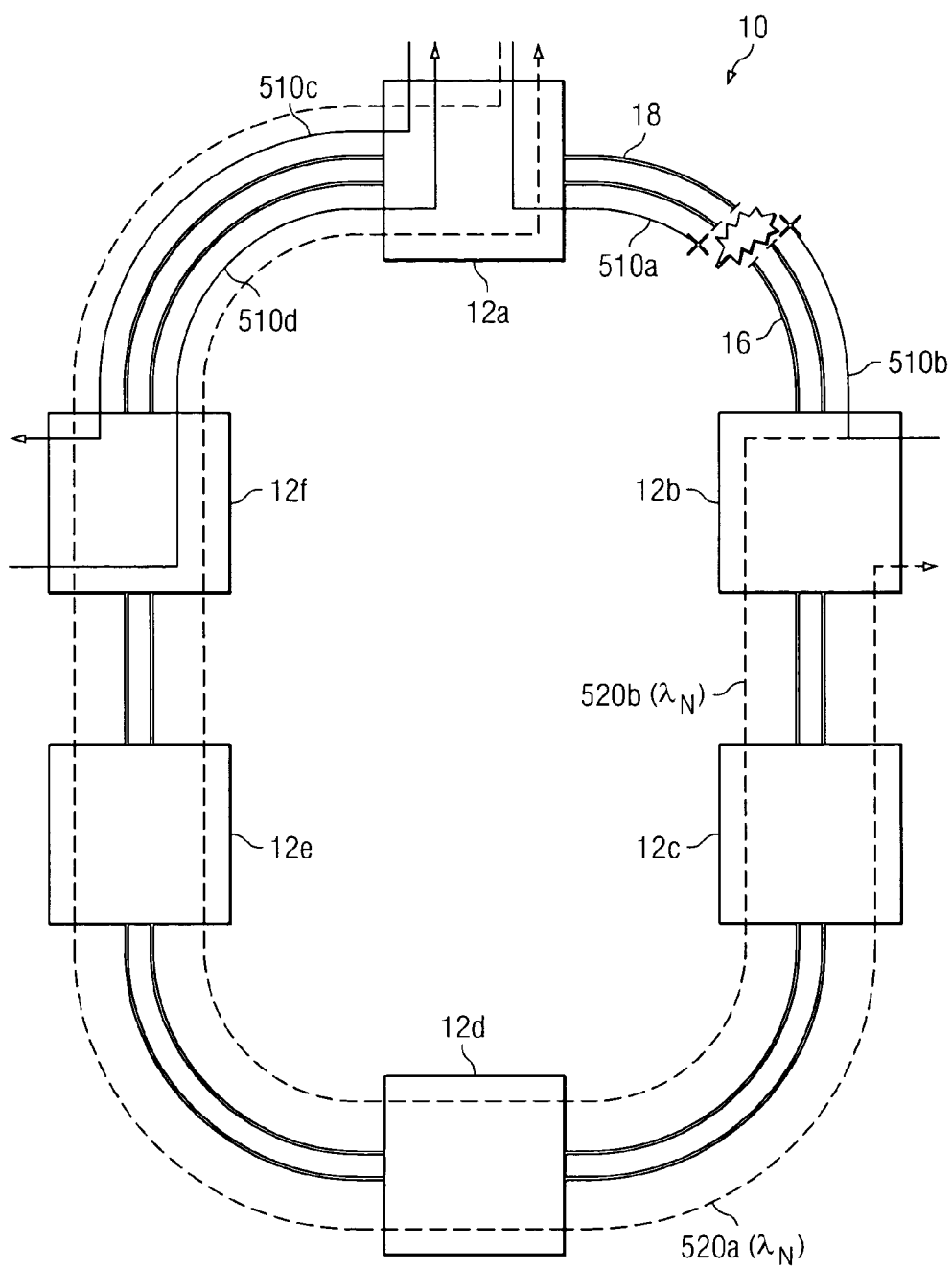

FIG. 5B illustrates operation of network 10 following a fault or other occurrence that disrupts the transmission of working traffic stream 510a from node 12a to node 12b and working stream 510b from node 12b to node 12a. In the illustrated embodiment of network 10, an appropriate element of network 10 detects the fault and communicates information regarding the fault to one or more nodes 12 in network 10. For example, EMS 124 of node 12b may detect an LOL signal resulting from the termination of one or more optical signals being received by node 12b from node 12a and/or EMS 124 of node 12a may detect an LOL signal resulting from the termination of one or more optical signals being received by node 12a from node 12b. Node 12a and/or node 12b then communicate information regarding the fault to an NMS 126 of network 10, and NMS 126, in turn, sends appropriate components of network 10, including node 12a and/or 12b, an error message indicating that a fault has occurred between node 12a and node 12b. In general, however, appropriate components of network 10 may detect the fault in any suitable manner and may disseminate information pertaining to the fault to appropriate components in any suitable manner.

In response to the fault, in the illustrated embodiment of network 10, node 12a and node 12b begin transmitting protection traffic to replace working traffic streams 510a and 510b. In particular, nodes 12a and 12b determine a protection wavelength associated with the working wavelength of working traffic streams 510a and 510b. Nodes 12a and 12b may determine the associated protection wavelength in any appropriate manner.

In a particular embodiment of network 10, each node 12 includes an assignment table stored in memory 120 that specifies a protection wavelength in which to transmit a protection traffic stream 520 based on the wavelength in which the associated working traffic stream 510 was transmitted. More specifically, in such an embodiment, each working wavelength utilized by network 10 for transmitting working traffic streams 510 is associated with an assignment group in the assignment table. Furthermore, each assignment group is, in turn, associated with a protection wavelength. As a result, each working wavelength is associated with a protection wavelength in the assignment table that is shared with one or more other working wavelengths in the same assignment group. Each node 12 may additionally include logic for determining, using the assignment table, a protection wavelength in which to transmit a protection traffic stream 520 for a particular working traffic stream 510 based on the working wavelength on which that working traffic stream 510 is transmitted. The logic may comprise software encoded in a disk or other computer-readable medium and/or instructions encoded in an application-specific integrated circuit (ASIC), field programmable gate array (FPGA), or other processor or hardware. The assignment table (not shown) in this example is assumed to indicate that working traffic streams 510 transmitted in wavelength $\lambda_1$ on first fiber 16 are assigned to an assignment group associated with a protection wavelength of $\lambda_N$ and are transmitted on second fiber 18.

After determining the protection wavelength associated with the assignment group to which traffic streams 510a and 510b are assigned, node 12a, in this example, reconfigures appropriate components of node 12a to begin transmitting information that otherwise would have been transmitted in working traffic stream 510a in protection traffic stream 520b in a clockwise direction on second fiber 18 at wavelength $\lambda_N$. As part of this reconfiguration, node 12a may retune a transmitter 104 in a particular add element 240 transmitting working traffic stream 510a to facilitate the transmission of protection traffic stream 520a on second fiber 18 at $\lambda_N$. Additionally, node 12b reconfigures appropriate components of node 12b to begin receiving information associated with protection traffic stream 520a on second fiber 18 in the protection wavelength $\lambda_N$. As part of this reconfiguration, node 12b may retune a filter 100 associated with the destination local port 90 to pass traffic in the protection wavelength to a particular receiver 102 associated with the destination local port 90. Additionally, if appropriate, node 12b may retune the receiver 102 associated with the destination local port 90 to allow the receiver 102 to detect and/or receive optical traffic in the wavelength $\lambda_N$. As a result, the destination local port 90 begins to receive protection traffic stream 520a.

Because the fault in the illustrated embodiment of network 10 disrupts working traffic stream 510b as well, nodes 12b and 12a also reconfigure in a similar fashion to facilitate, respectively, the transmission and reception of protection traffic stream 520b on first fiber 16. In this example, working traffic stream 510b is being transmitted in the same working wavelength, $\lambda_1$, as working traffic stream 510a. Similarly, protection traffic stream 520b is transmitted at a protection wavelength of $\lambda_N$. Thus, nodes 12b and 12a reconfigure appropriate components of nodes 12b and 12a and begin transmitting and receiving protection traffic stream 520b at wavelength $\lambda_N$ as shown in FIG. 5B.

Figure 5C:
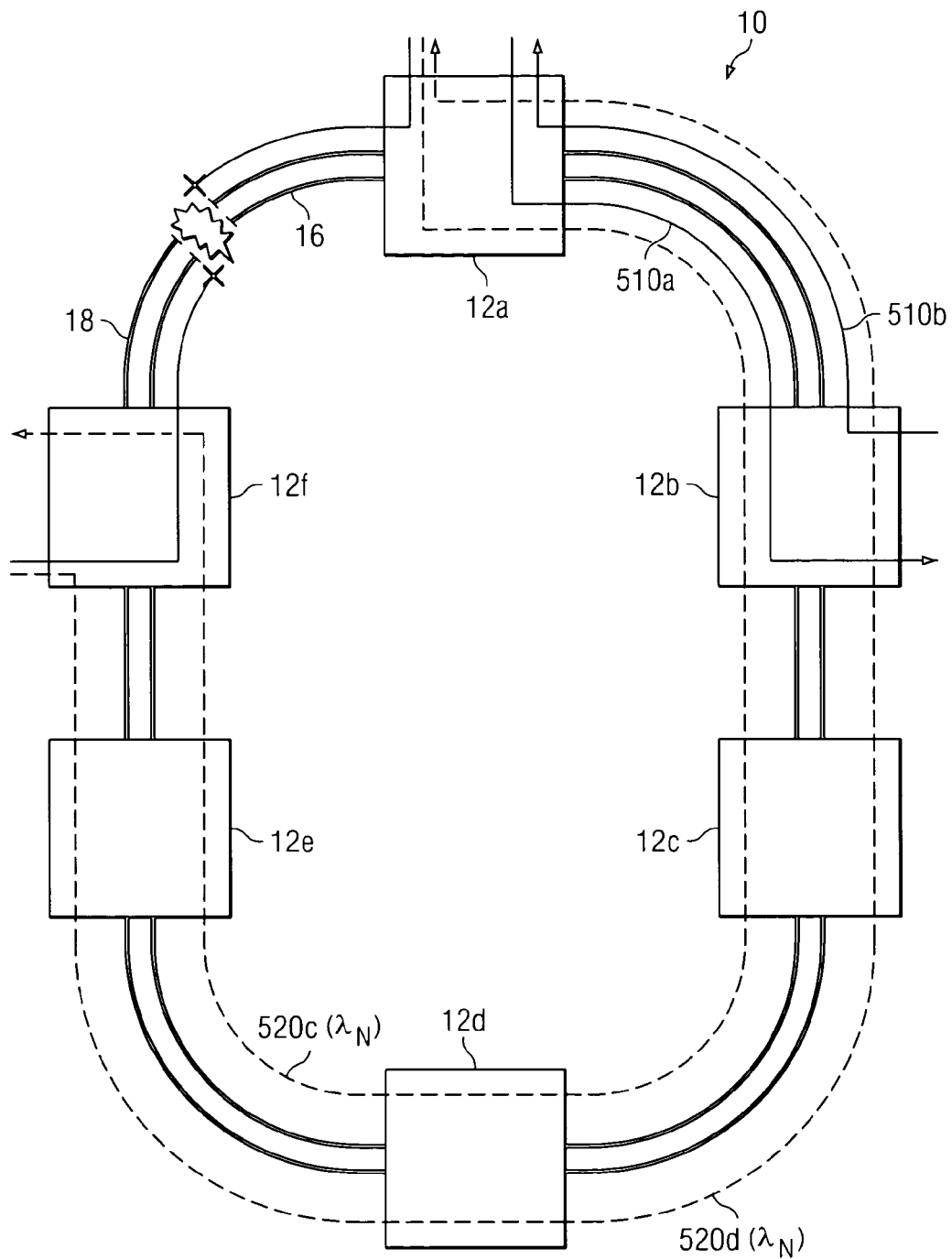

FIG. 5C illustrates operation of network 10 following a second fault that disrupts the transmission of working traffic stream 510a from node 12a to node 12b. As noted above, for the sake of simplicity, network 10 is assumed to be susceptible to only one fault at any given time. Consequently, this second fault is assumed to occur following any appropriate remedial action taken to correct the first fault and/or any other previous faults.

In the illustrated embodiment of network 10, the EMS of node 12f or 12a detects a loss-of-light (LOL) signal resulting from the termination of one or more optical signals being received by that node 12. Node 12f or 12a then communicates information regarding the fault to an NMS of network 10, and NMS, in turn, sends appropriate components of network 10, including node 12a and/or 12f, an error message indicating that a fault has occurred between node 12a and node 12f. In general, however, appropriate components of network 10 may detect the fault in any suitable manner and may disseminate, in any suitable manner, information pertaining to the fault to other appropriate components of network 10.

In response to the second fault, node 12a and node 12f begin transmitting protection traffic to replace working traffic streams 510c and 510d. In particular, nodes 12a and 12f determine a protection wavelength associated with the working wavelength of working traffic streams 510c and 510d, both of which are transmitted at $\lambda_2$. Nodes 12a and 12b may determine the associated protection wavelength in any appropriate manner. As noted above, nodes 12 may each include an assignment table that specifies a protection wavelength for each working wavelength utilized by network 10. In the illustrated example, $\lambda_2$, like $\lambda_1$ in this example, is assumed to be associated with a protection wavelength of $\lambda_N$ in the assignment table. Thus, nodes 12a and 12f respond to the second fault by reconfiguring appropriate components of nodes 12a and 12f to facilitate transmission and reception of protection traffic streams 520c and 520d in a protection wavelength of $\lambda_N$. As described above, this reconfiguration may include retuning appropriate filters 100, transmitters 102, and receivers 104 of nodes 12a and 12f.

Thus, because nodes 12 can be reconfigured during operation as described, nodes 12a and 12f are capable of utilizing the same wavelength, $\lambda_N$, for transmitting protection streams 520c and 520d as nodes 12a and 12b utilize for transmitting protection streams 520a and 520b. Consequently, network 10 may be able to protect multiple working wavelengths using a single protection wavelength. As a result, particular embodiments of network 10 may provide more efficient use of the bandwidth available on network 10 than previous protection schemes that provide a protection wavelength for each working wavelength.

Figure 5D:
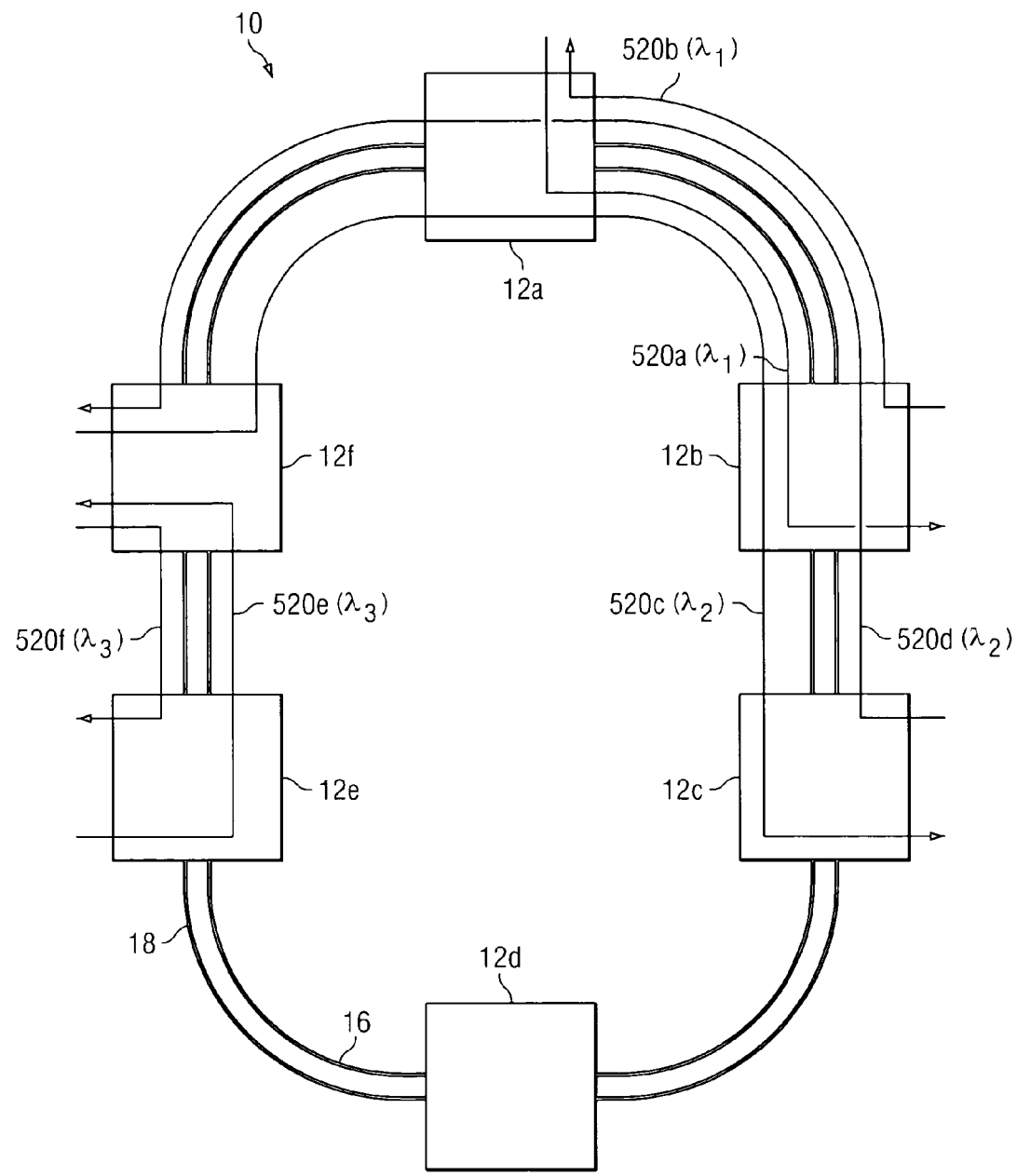

In particular, assuming no more than one fault affects network 10 at any given time, network 10 may be capable of supporting protection traffic streams 520 for all working traffic streams 510 being transmitted on network 10 using a number of protection wavelengths equal to the maximum number of working wavelengths utilized by working traffic streams 510 on any span of network 10. FIG. 5D below provides an example that illustrates this point in greater detail.

FIG. 5D illustrates operation of network 10 while generating six working traffic streams 510a-e. In this example, the maximum number of working wavelengths utilized for working traffic streams 510 in any one span of network 10 is two (between nodes 12a and 12b). Thus, in this example, network 10 could support protection traffic streams 520 for any working traffic streams 510 affected by a particular fault using only two distinct protection wavelengths.

Thus, particular embodiments of network 10 may support a traffic protection scheme in which multiple working wavelengths are protected by a single protection wavelength. Such a protection scheme may result in more efficient use of the network bandwidth by reducing the number of protection channels needed to protect a given number of working channels. As a result, particular embodiments of network 10 may provide these and/or other operational benefits.

FIGS. 6A-6D illustrate operation of a particular embodiment of network 10 that utilizes protection traffic streams 620 transmitted in a pair of protection wavelengths to protect two or more pairs of working traffic streams 610. In particular, working traffic streams 610 are grouped in working traffic pairs 640 with a first working traffic stream 610 of each pair transmitted in a first wavelength of one of a plurality of working wavelength pairs and a second working traffic stream 610 transmitted in a second wavelength of the same working wavelength pairs. These "working wavelength pairs" may include any two working wavelengths, and a particular working traffic pairs 640 may be transmitted in a working wavelength pair that is determined in any appropriate manner.

Furthermore, in the illustrated example, each working wavelength pair utilized by network 10 is assigned to an assignment group, with each assignment group associated with a pair of protection wavelengths, referred to here as a "protection wavelength pair." More specifically, one working wavelength of each working wavelength pair is associated with one protection wavelength of the assigned protection wavelength pair, and the other working wavelength of that working wavelength pair is associated with the other protection wavelength of the assigned protection wavelength pair. Furthermore, multiple working wavelength pairs may be assigned a given protection wavelength pair. As a result, pairs of protection wavelengths are assigned to protect pairs of working wavelengths, and multiple working wavelength pairs may share each protection wavelength pair.

Figure 6A:
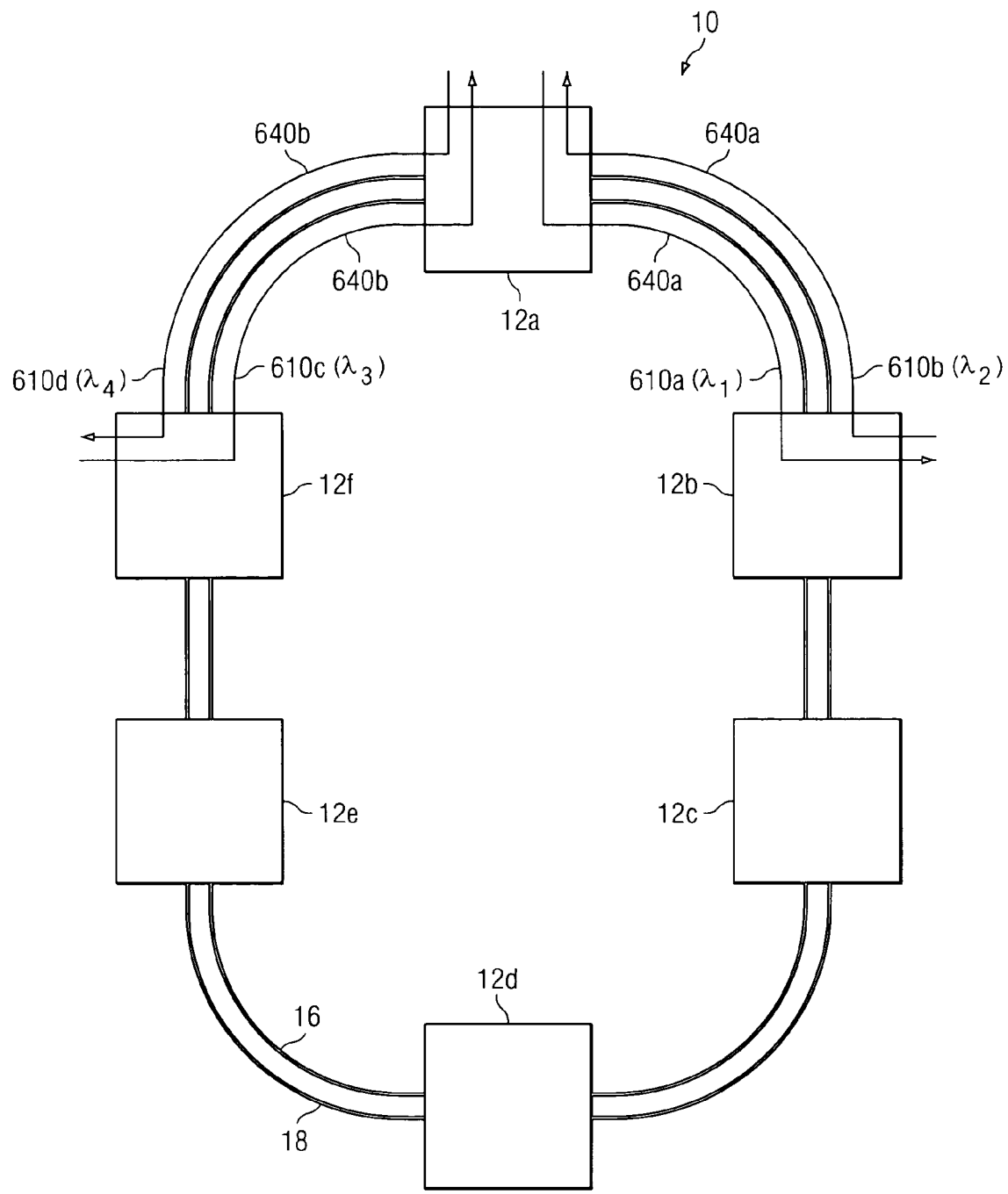
FIGS. 6A-6C illustrates operation of a particular embodiment of the network illustrated in FIG. 1 implementing a protection scheme that utilizes shared wavelength pairs.

FIG. 6A illustrates an example of the operation of an embodiment of network 10 that includes nodes 12a-e. In the illustrated example, network 10 uses both first fiber 16 and second fiber 18 to propagate working traffic streams 610. Protection traffic streams 620, in this example embodiment, are transmitted in the opposite direction from the associated working traffic stream 610. Additionally, working traffic streams 610 and protection traffic streams 620 are generated by particular nodes 12 and added, as appropriate, to a WDM or DWDM signal propagating on first fiber 16 or second fiber 18.

In the illustrated example, node 12a transmits a first working traffic stream 610a to node 12b clockwise along first fiber 16 carrying signals generated by node 12a or received by node 12a at a local port 90 of node 12a. Node 12b also transmits a working traffic stream 610b to node 12a counterclockwise along second fiber 18. In this example, working traffic streams 610a and 610b form a working traffic pair 640a. Working traffic pairs 640 may each include a pair of working traffic streams 610 that are associated with one another based on any appropriate criteria. For example, in the illustrated example, each working traffic pair 640 includes two traffic streams 610 associated with a particular communication session being communicated between two nodes 12, such as a telephone call, with each traffic stream 610 carrying communication from the communication stream 610 in a particular direction on network 10.

Furthermore, nodes 12a and 12b transmit each of working traffic streams 610a and 610b, respectively, in a different working wavelength of a particular working wavelength pair. Each working wavelength pairs utilized on network 10 includes two working wavelengths, referred to here solely for purposes of illustration as "a first working wavelength" and "a second working wavelength" of the working wavelength pair. The appropriate working wavelength pair in which to transmit working traffic pair 640a may be determined in any appropriate manner. As illustrated in FIG. 6, nodes 12a and 12b transmit working traffic pair 640a in a working wavelength pair that includes $\lambda_1$ and $\lambda_2$. More specifically, node 12a transmits working traffic stream 610a in a working wavelength of $\lambda_1$, and node 12b transmits working traffic stream 610b in a working wavelength of $\lambda_2$.

Additionally, node 12a concurrently transmits working traffic stream 610c to node 12f counterclockwise along second fiber 18. Node 12f also transmits working traffic stream 610d to node 12a clockwise along first fiber 16. As illustrated, working traffic streams 610c and 610d form working traffic pair 640b. Nodes 12f and 12a transmit working traffic pair 640b on a working wavelength pair that may be determined in any appropriate manner. In the illustrated example, nodes 12f and 12a transmit working traffic pair 640b in a working wavelength pair that includes $\lambda_3$ and $\lambda_4$. More specifically, node 12f transmits working traffic stream 610c in a working wavelength of $\lambda_3$, and node 12a transmits working traffic stream 610d in a working wavelength of $\lambda_3$.

With respect to receiving working traffic streams 610, node 12b receives an optical signal on first fiber 16 that includes working traffic stream 610a. Node 12b forwards the optical signal, including working traffic stream 610a, to one or more drop elements 230 of node 12b, as described above with respect to FIG. 2. One or more destination drop elements 230 for working traffic stream 610a may be configured to receive traffic from first fiber 16 in the wavelength at which working traffic stream 610a was transmitted, $\lambda_1$. More specifically, a tunable filter 100 of a particular drop element 230 may be tuned to pass traffic propagating in the wavelength of working traffic stream 610a, $\lambda_1$, and a receiver 102 of that drop element 230 may be tuned to receive traffic propagating in $\lambda_1$ and convert the optical signals of that traffic into electrical signals for use by node 12b or components coupled to node 12b. Nodes 12b, 12f, and 12a receive working traffic streams 610b, 610c, and 610d, respectively, in a similar manner.

Although FIG. 6A illustrates an example in which a working traffic pair 640 is transmitted between node 12a and each of nodes 12b and 12f, a particular embodiment of network 10 may support any number of working traffic pairs 640 transmitted between any number of nodes 12. Moreover, working traffic pairs 640 may be transmitted between the same two nodes 12, between one common node 12 and two other separate nodes 12, and/or between two separate pairs of nodes 12. In general, any two or more nodes may transmit working traffic pairs 640 using the described protection techniques.

Figure 6B:
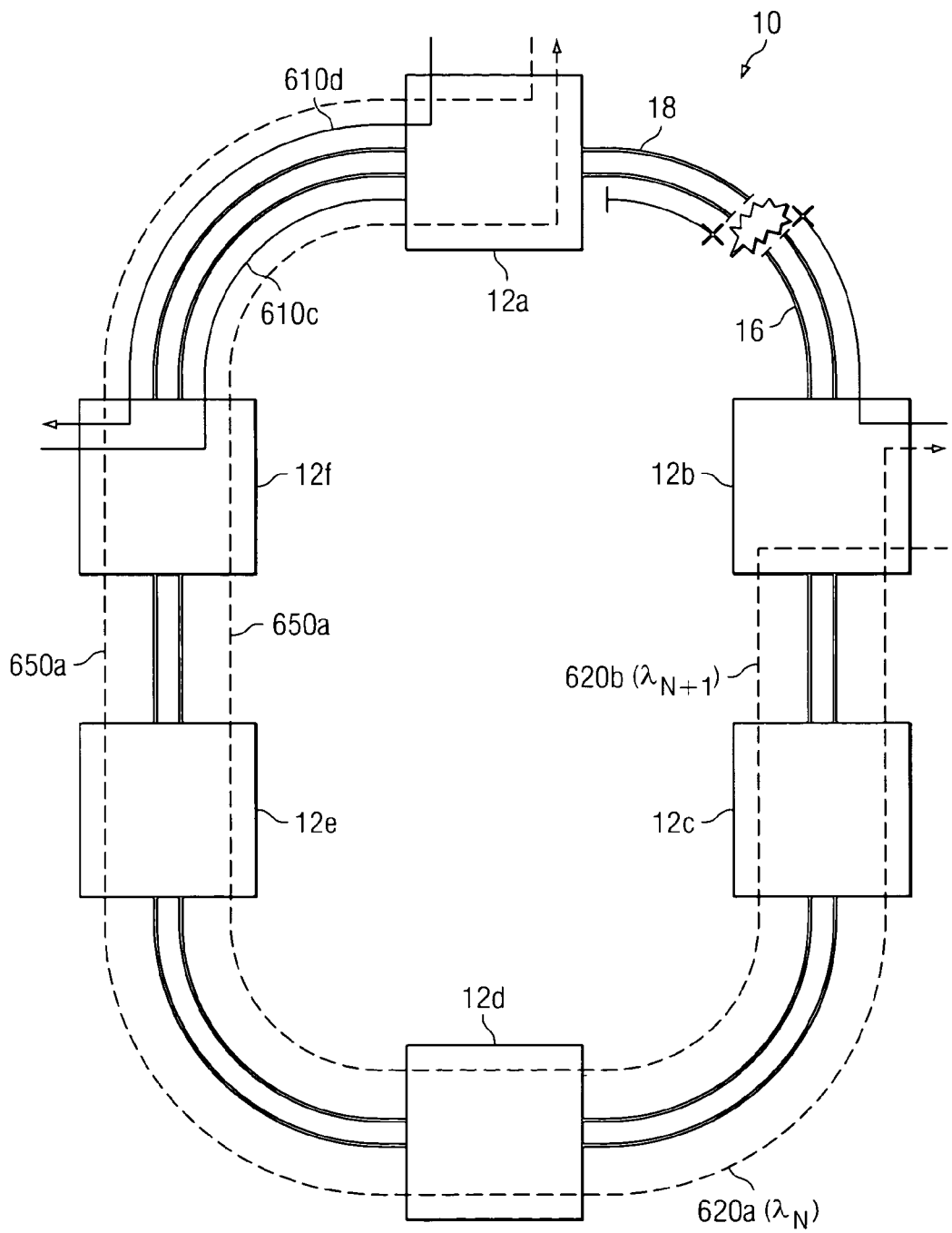

FIG. 6B illustrates operation of network 10 following a fault or other occurrence that disrupts the transmission of both working traffic streams 610 in working traffic pair 640a. In the illustrated embodiment of network 10, an appropriate element of network 10 detects the fault and communicates information regarding the fault to one or more nodes 12 in network 10, as described above. In general, appropriate components of network 10 may detect the fault in any suitable manner and may disseminate information pertaining to the fault to appropriate components in any suitable manner.

In response to the fault, in the illustrated embodiment of network 10, node 12a and node 12b begin transmitting protection traffic to replace working traffic streams 610a and 610b. In particular, nodes 12a and 12b determine a protection wavelength pair associated with the working wavelength pair of working traffic pair 640a. Nodes 12a and 12b may determine the associated protection wavelength pair in any appropriate manner. A particular working wavelength pair may be associated with a protection wavelength pair in any suitable manner based on any appropriate criteria, and information specifying these assignments may be stored in one or more nodes 12.

As described above, nodes 12 may each include an assignment table stored in memory 120 that specifies a protection wavelength pair on which to transmit a protection traffic pair 620 based on the working wavelength pair in which the associated working traffic pair 640 was transmitted. Each working wavelength pair utilized by network 10 for working traffic pairs 640 is assigned to an assignment group and is, as a result, associated with a protection wavelength pair that may be shared with one or more other working wavelength pairs in the same assignment group. Each node 12 may additionally include logic for determining, using the assignment table, a protection wavelength on which to transmit a protection traffic stream 620 for a particular working traffic stream 610 based on the working wavelength in which that working traffic stream 610 is transmitted. The logic may comprise software encoded in a disk or other computer-readable medium and/or instructions encoded in an application-specific integrated circuit (ASIC), field programmable gate array (FPGA), or other processor or hardware. The assignment table (not shown) in this example is assumed to indicate that working wavelength pair for working wavelength stream 640a, $\lambda_1$ and $\lambda_2$, are assigned to an assignment group associated with a protection wavelength pair of $\lambda_N$ and $\lambda_{N+1}$. Furthermore, the assignment table is assumed to indicate that, within the working wavelength pair, working wavelength $\lambda_1$ is associated with a protection wavelength $\lambda_N$ and working wavelength $\lambda_2$ is associate with protection wavelength $\lambda_{N+1}$.

After determining the protection wavelength pair associated with the assignment group of the relevant working wavelength pair and determining an appropriate protection wavelength from that protection wavelength pair for each working wavelength, node 12a, in this example, reconfigures appropriate components of node 12a to begin transmitting information that otherwise would have been transmitted in working traffic pair 640a in a protection traffic pair 650a that includes protection traffic streams 620a and 620b. More specifically, node 12a reconfigures itself to begin transmitting protection traffic stream 620a counterclockwise on second fiber 18 in a protection wavelength of $\lambda_N$ to replace working traffic stream 610a. Additionally, node 12b reconfigures itself to begin transmitting protection traffic stream 620b clockwise on first fiber 16 in a protection wavelength of $\lambda_{N+1}$. As part of this reconfiguration, nodes 12a and 12b may retune transmitters 104 in particular add elements 240 transmitting working traffic streams 610 to facilitate the transmission of protection traffic streams 620 on the appropriate fiber at the appropriate protection wavelength.

Additionally, nodes 12a and 12b may reconfigure appropriate components of nodes 12a and 12b to begin receiving information associated with protection traffic streams 620 on the appropriate fiber at the appropriate protection wavelength $\lambda_N$, as described above. As part of this reconfiguration, nodes 12a and 12b may retune filters 100 associated with the appropriate drop elements 230 to pass traffic in the protection wavelength to a particular receiver 102 of that node 12. Additionally, if appropriate, node 12b may retune that receiver 102 to allow the receiver 102 to detect and/or receive optical traffic in the appropriate protection wavelength.

Figure 6C:
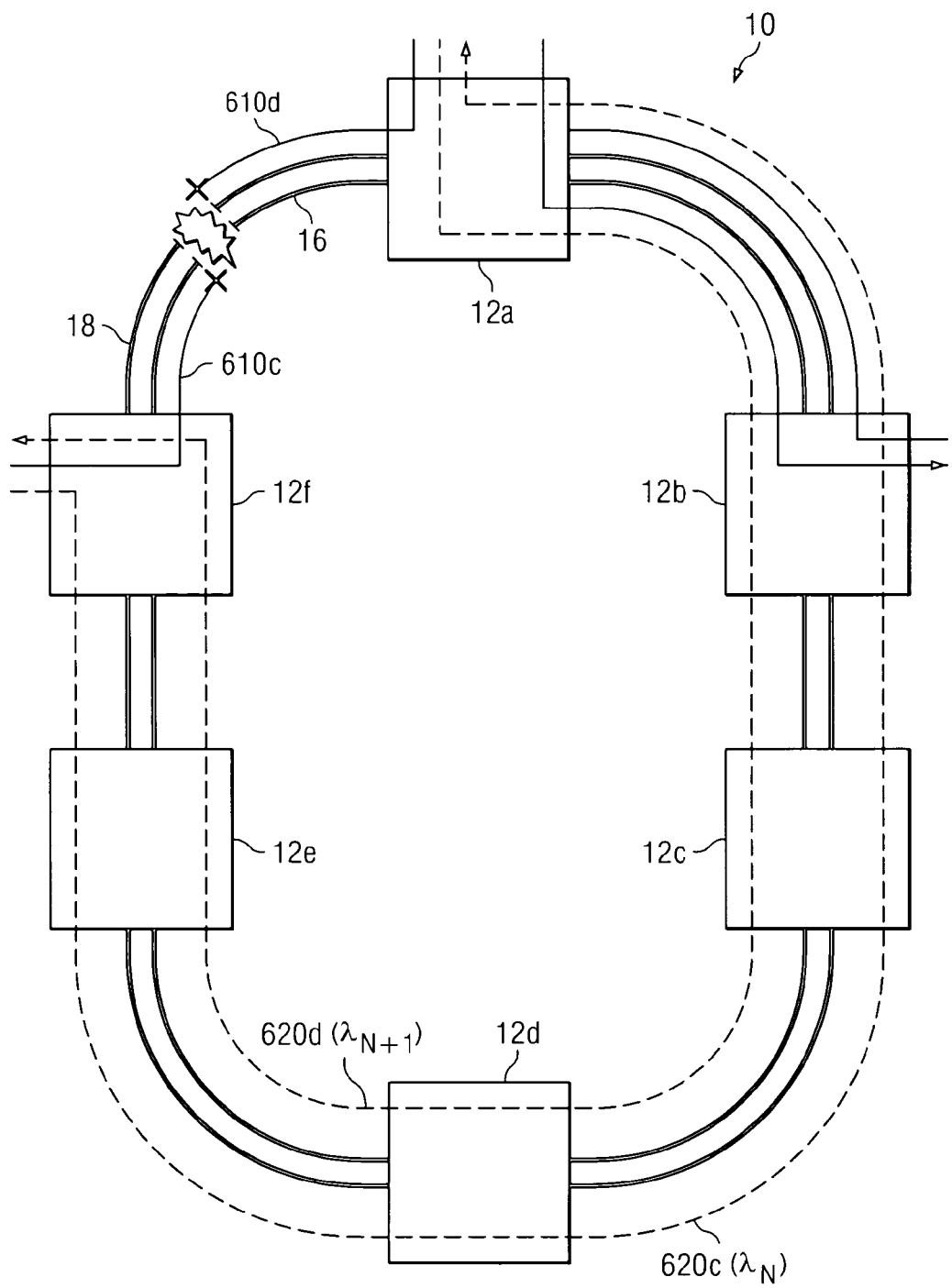

FIG. 6C illustrates operation of network 10 following a second fault that disrupts the transmission of working traffic pair 610c and 610d from node 12a to node 12f. As noted above, for the sake of simplicity, network 10 is assumed to be susceptible to only one fault at any given time. Consequently, this second fault is assumed to occur following any appropriate remedial action taken to correct the first fault and/or any other previous faults.

EMS 124 of node 12f or 12a or other appropriate components of network 10 may detect the fault as described above. In response to the second fault, node 12a and node 12f begin transmitting protection traffic to replace working traffic streams 610c and 610d. In particular, nodes 12a and 12f determine a protection wavelength associated with the working wavelength pair of working traffic pair 640b which includes working wavelengths $\lambda_3$ and $\lambda_4$. Nodes 12a and 12b may determine the associated protection wavelength pair in any appropriate manner. As noted above, nodes 12, in the illustrated embodiment, each include an assignment table that specifies a protection wavelength pair for each working wavelength pair and, within a particular working wavelength pair, a protection wavelength from that protection wavelength pair for each working wavelength. In the illustrated example, $\lambda_3$ and $\lambda_4$, are also associated with protection wavelengths $\lambda_N$ and $\lambda_{N+1}$ in the assignment table of the example. More specifically, $\lambda_N$ is assigned to protect $\lambda_3$ in the illustrated example, and $\lambda_{N+1}$ is assigned to protect $\lambda_4$. Thus, nodes 12a and 12f respond to the second fault by reconfiguring appropriate components of nodes 12a and 12f to facilitate transmission and reception of protection traffic streams 620c and 620d at a protection wavelength of $\lambda_N$ and $\lambda_{N+1}$, respectively. As described above, this reconfiguration may include retuning appropriate filters 100, transmitters 102, and receivers 104 of nodes 12a and 12f.

Because nodes 12 can be reconfigured during operation as described, nodes 12f and 12a are capable of utilizing the same protection wavelength pair, $\lambda_N$ and $\lambda_{N+1}$, for transmitting protection streams 620c and 620d, respectively, as nodes 12a and 12b utilize for transmitting protection streams 620a and 620b, despite the fact that the associated working traffic pairs 640 were transmitted in different working wavelength pairs. Consequently, network 10 may be able to protect working traffic pairs 640 transmitted in multiple working wavelength pairs using a single pair of protection wavelengths. As a result, particular embodiments of network 10 may provide more efficient use of the bandwidth available on network 10 than previous protection schemes that provide a protection wavelength for each working wavelength. Additionally, although FIGS. 6A-6C illustrate, for the sake of simplicity, an example operation in which two working wavelength pairs are protected by a single pair of protection wavelengths, particular embodiments of network 10 may protect more than two working wavelength pairs with each pair of protection wavelengths. Moreover, additional pairs of protection wavelengths may be utilized by network 10 to protect other working wavelength pairs.

Although the present invention has been described with several embodiments, various changes and modifications may be suggested to one skilled in the art. It is intended that the present invention encompass such changes and modifications as fall within the scope of the appended claims.

What is claimed is:

1. A method for providing optical communication, comprising:

transmitting a plurality of working traffic streams on an optical ring, each working traffic streams comprising traffic transmitted in one of a plurality of wavelengths of an optical signal;

in response to an interruption of a first working traffic stream:

transmitting, in a first wavelength, a first protection traffic stream associated with the first working traffic stream; and selectively regenerating the first protection traffic stream at a regeneration element coupled to the optical ring, the regeneration element being tuned to receive the first wavelength; and in response to an interruption of a second working traffic stream:

transmitting, in a second wavelength, a second protection traffic stream associated with a second working traffic stream;

tuning the regeneration element to receive the second wavelength; and selectively regenerating the second protection traffic stream at the regeneration element.

2. The method of claim 1, wherein:

transmitting the plurality of working traffic streams comprises transmitting the first working traffic stream and the second working traffic stream in a first direction around the optical ring;

transmitting the first protection traffic stream comprises transmitting the first protection traffic stream in a second direction around the optical ring; and transmitting the second protection traffic stream comprises transmitting the second protection traffic stream in the second direction around the optical ring.

3. The method of claim 1, wherein:
selectively regenerating the first protection traffic stream comprises selectively regenerating the first traffic stream in the first wavelength at the regeneration element; and
selectively regenerating the second protection traffic stream comprises selectively regenerating the second traffic stream in the second wavelength at the regeneration element.

4. The method of claim 1, wherein:
selectively regenerating the first protection traffic stream comprises selectively regenerating the first traffic stream in a wavelength different from the first wavelength; and
selectively regenerating the second protection traffic stream comprises selectively regenerating the second traffic stream in a wavelength different from the second wavelength.

5. The method of claim 1, wherein selectively regenerating the first protection traffic stream comprises:
tuning a filter of the regeneration element to pass traffic received by the filter in the first wavelength;
forwarding the first protection traffic stream through the filter;
generating a first electrical signal at a receiver of the regeneration element based on the output of the filter;
receiving the first electrical signal at a transmitter; and
transmitting, from the transmitter, a regenerated traffic stream based on the first electrical signal; and wherein selectively regenerating the second protection traffic stream comprises:
tuning the filter to pass traffic received by the filter in the second wavelength;
forwarding the second protection traffic stream through the filter
generating a second electrical signal at the receiver based on the output of the filter;
receiving the second electrical signal at the transmitter; and
transmitting, from the transmitter, a regenerated traffic stream based on the second electrical signal.

6. The method of claim 5, wherein generating the first electrical signal comprises:
tuning the receiver to receive traffic in the first wavelength; and
generating the first electrical signal at the receiver based on the output of the filter; and wherein generating the second electrical signal comprises:
tuning the receiver to receive traffic in the second wavelength; and
generating the second electrical signal at the receiver based on the output of the filter.

7. An optical network, comprising:
an optical ring coupling a plurality of nodes and operable to transmit a plurality of working traffic streams between two or more nodes, each working traffic stream comprising traffic transmitted in one of a plurality of wavelengths of an optical signal, the plurality of working traffic streams including a first working traffic stream and a second working traffic stream;
the plurality of nodes, wherein one or more of the nodes is operable to:
in response to an interruption of the first working traffic stream, transmit, in a first wavelength, a first protection traffic stream associated with the first working traffic stream; and
in response to an interruption of the second working traffic stream, transmit, in a second wavelength, a second protection traffic stream associated with the second working traffic stream; and a regeneration element coupled to the optical ring and operable to:
selectively regenerate the first protection traffic stream;
tune the regeneration element to receive traffic in the second wavelength in response to the interruption of the second working traffic stream; and
selectively regenerate the second protection traffic stream.

8. The optical network of claim 7, further comprising a network management system (NMS) operable to detect faults on the optical ring and wherein the regeneration element is operable to tune the regeneration element in response to the interruption by tuning the regeneration element to receive traffic in the second wavelength in response to the NMS detecting an interruption of the second working traffic stream.

9. The optical network of claim 7, wherein one or more of the nodes are operable to:
transmit the first working traffic stream and the second working traffic in a first direction around the optical ring; and
transmit the first protection traffic stream and the second protection traffic stream in a second direction around the optical ring.

10. The optical network of claim 7, wherein the regeneration element is operable to:
selectively regenerate the first protection traffic stream by selectively regenerating the first traffic stream in the first wavelength at the regeneration element; and
selectively regenerate the second protection traffic stream by selectively regenerating the second traffic stream in the second wavelength at the regeneration element.

11. The optical network of claim 7, wherein the regeneration element is operable to:
selectively regenerating the first protection traffic stream comprises selectively regenerating the first traffic stream in a wavelength different from the first wavelength at the regeneration element; and
selectively regenerating the second protection traffic stream comprises selectively regenerating the second traffic stream in a wavelength different from the second wavelength at the regeneration element.

12. The optical network of claim 7, wherein the regeneration element comprises:
a tunable filter operable to pass traffic received in a tuned wavelength of the tunable filter and block traffic received in any other wavelength;
a receiver operable to generate an electrical signal based on traffic received from the tunable filter; and
a transmitter operable to transmit a regenerated traffic stream based on the electrical signal generated by the receiver; and wherein the regeneration element is further operable to adjust the tuned wavelength of the tunable filter in response to an interruption in a working traffic stream propagating on the optical ring.

13. The optical network of claim 12, wherein the receiver comprises a tunable receiver that is operable to generate the electrical signal based on traffic received from the tunable filter that is in the tuned wavelength of the tunable receiver; and wherein the regeneration element is further operable to adjust the tuned wavelength of the tunable receiver in response to an interruption in a working traffic stream propagating on the optical ring.

* * * * *